US010828963B2

(12) United States Patent
Vehr et al.

(10) Patent No.: US 10,828,963 B2
(45) Date of Patent: Nov. 10, 2020

(54) SYSTEM AND METHOD OF MODE-BASED COMPRESSOR SPEED CONTROL FOR REFRIGERATED VEHICLE COMPARTMENT

(71) Applicant: Emerson Climate Technologies, Inc., Sidney, OH (US)

(72) Inventors: Shawn W. Vehr, Dayton, OH (US); Joseph J. Rozsnaki, Troy, OH (US); Louis Siefker, Elida, OH (US)

(73) Assignee: Emerson Climate Technologies, Inc., Sydney, OH (US)

( * ) Notice: Subject to any disclaimer, the term of this patent is extended or adjusted under 35 U.S.C. 154(b) by 243 days.

(21) Appl. No.: 15/635,444

(22) Filed: Jun. 28, 2017

(65) Prior Publication Data

US 2018/0001745 A1 Jan. 4, 2018

Related U.S. Application Data

(60) Provisional application No. 62/356,631, filed on Jun. 30, 2016.

(51) Int. Cl.
*B60H 1/32* (2006.01)
*B60H 1/00* (2006.01)

(52) U.S. Cl.
CPC ........... *B60H 1/3211* (2013.01); *B60H 1/005* (2013.01); *B60H 2001/3255* (2013.01);
(Continued)

(58) Field of Classification Search
CPC .................. B60H 1/3205; B60H 1/004; B60H 2001/3255; B60H 2001/3272;
(Continued)

(56) References Cited

U.S. PATENT DOCUMENTS 2,895,308 A 7/1959 McNeil
4,043,144 A 8/1977 Klotz et al.
(Continued)

FOREIGN PATENT DOCUMENTS

JP 2002130891 A 5/2002
JP 4354372 B2 10/2009
(Continued)

OTHER PUBLICATIONS

Election/Restriction Requirement regarding U.S. Appl. No. 15/635,760 dated May 30, 2018.
(Continued)

*Primary Examiner* — Marc E Norman
*Assistant Examiner* — Schyler S Sanks
(74) *Attorney, Agent, or Firm* — Harness, Dickey & Pierce, P.L.C.

(57) ABSTRACT

A system is provided that includes mode, shore power, engine, and battery modules. The mode module determines whether to operate in a shore power, engine, or battery mode based on parameters. The shore power module, while in the shore power mode, runs a compressor at a speed based on a temperature within a container of a vehicle and limits the speed to a first speed. A battery is charged based on utility power while in the shore power mode. The engine module, while in the engine mode, limits the compressor speed to a second speed. The battery, while in the engine mode, is charged based on power received from an alternator/generator. The battery module, while in the battery mode, limits the compressor speed to a third speed. While in the battery mode, the battery is not being charged based on power from a shore power source and the alternator/generator.

41 Claims, 18 Drawing Sheets

(52) U.S. Cl.
CPC .............. *B60H 2001/3272* (2013.01); *B60H 2001/3277* (2013.01); *B60H 2001/3282* (2013.01); *B60H 2001/3283* (2013.01); *B60H 2001/3289* (2013.01)

(58) Field of Classification Search
CPC .... B60H 2001/3277; B60H 2001/3282; B60H 2001/3289; B60H 2001/3266; B60H 2001/3273; B60H 1/323; B60H 1/005; B60R 16/03
See application file for complete search history.

(56) References Cited

U.S. PATENT DOCUMENTS

| | | | |
|---|---|---|---|
| 4,328,855 A | 5/1982 | Iwata et al. | |
| 4,616,484 A | 10/1986 | Mehdi et al. | |
| 4,658,593 A | 4/1987 | Stenvinkel | |
| 5,265,435 A | 11/1993 | Richardson | |
| 5,395,224 A | 3/1995 | Caillat et al. | |
| 5,651,260 A | 7/1997 | Goto et al. | |
| 5,929,609 A | 7/1999 | Joy et al. | |
| 6,230,507 B1 | 5/2001 | Ban et al. | |
| 6,411,059 B2 | 6/2002 | Frugier et al. | |
| 6,487,869 B1* | 12/2002 | Sulc | B60H 1/3205 62/228.4 |
| 6,543,245 B1 | 4/2003 | Waldschmidt et al. | |
| 6,622,505 B2 | 9/2003 | Anderson et al. | |
| 6,640,564 B2 | 11/2003 | Yamashita et al. | |
| 6,889,762 B2 | 5/2005 | Zeigler et al. | |
| 7,040,877 B2 | 5/2006 | Bergman et al. | |
| 7,174,736 B2 | 2/2007 | Chen et al. | |
| 7,398,653 B2 | 7/2008 | Oomura et al. | |
| 7,591,143 B2 | 9/2009 | Zeigler et al. | |
| 7,832,221 B2 | 11/2010 | Wijaya et al. | |
| 7,963,117 B2 | 6/2011 | Allen et al. | |
| 7,966,839 B2 | 6/2011 | McEnaney et al. | |
| 8,123,490 B2 | 2/2012 | Goto et al. | |
| 8,161,758 B2 | 4/2012 | Bailey et al. | |
| 8,181,478 B2 | 5/2012 | Ignatiev | |
| 8,342,810 B2 | 1/2013 | Koyama | |
| 8,453,722 B2 | 6/2013 | Zeigler et al. | |
| 8,534,082 B2 | 9/2013 | Price et al. | |
| 8,672,642 B2 | 3/2014 | Tolbert, Jr. et al. | |
| 8,723,458 B1 | 5/2014 | Chambers | |
| 8,769,982 B2 | 7/2014 | Ignatiev et al. | |
| 8,935,933 B1 | 1/2015 | Koelsch | |
| 9,126,544 B2 | 9/2015 | Larson et al. | |
| 9,194,393 B2 | 11/2015 | Pham | |
| 9,557,100 B2 | 1/2017 | Chopko et al. | |
| 9,688,181 B2 | 6/2017 | Dutta et al. | |
| 9,689,598 B2 | 6/2017 | Truckenbrod et al. | |
| 10,230,236 B2 | 3/2019 | Schumacher et al. | |
| 10,532,632 B2 | 1/2020 | Vehr et al. | |
| 2003/0077179 A1 | 4/2003 | Collins et al. | |
| 2003/0106332 A1 | 6/2003 | Okamoto et al. | |
| 2003/0118450 A1 | 6/2003 | Iwanami et al. | |
| 2003/0136138 A1 | 7/2003 | Tsuboi et al. | |
| 2003/0201097 A1 | 10/2003 | Zeigler et al. | |
| 2004/0231831 A1 | 11/2004 | Houck et al. | |
| 2006/0151163 A1 | 7/2006 | Zeigler et al. | |
| 2007/0052241 A1 | 3/2007 | Pacy | |
| 2007/0056300 A1 | 3/2007 | Crane | |
| 2007/0131408 A1* | 6/2007 | Zeigler | B60H 1/00378 165/240 |
| 2007/0151273 A1 | 7/2007 | Nelson et al. | |
| 2007/0209378 A1 | 9/2007 | Larson | |
| 2008/0011007 A1 | 1/2008 | Larson et al. | |
| 2008/0014852 A1 | 1/2008 | Mielke et al. | |
| 2008/0034773 A1 | 2/2008 | Karapetian | |
| 2009/0011007 A1 | 1/2009 | Meier et al. | |
| 2010/0011788 A1 | 1/2010 | Lifson et al. | |
| 2010/0076664 A1 | 3/2010 | Monros | |
| 2010/0080713 A1 | 4/2010 | Douglas et al. | |
| 2010/0178175 A1 | 7/2010 | Koyama | |
| 2010/0180614 A1 | 7/2010 | Larson et al. | |
| 2010/0242510 A1* | 9/2010 | Kadle | B60H 1/00735 62/127 |
| 2011/0083450 A1 | 4/2011 | Turner et al. | |
| 2011/0110791 A1 | 5/2011 | Donnat et al. | |
| 2011/0265506 A1 | 11/2011 | Alston | |
| 2012/0152511 A1 | 6/2012 | Chang et al. | |
| 2012/0198869 A1 | 8/2012 | Morita et al. | |
| 2012/0262881 A1 | 10/2012 | Onimaru et al. | |
| 2012/0290161 A1 | 11/2012 | Takeda et al. | |
| 2013/0054072 A1 | 2/2013 | Christen et al. | |
| 2013/0199223 A1 | 8/2013 | Brooke et al. | |
| 2013/0240043 A1 | 9/2013 | Pham et al. | |
| 2013/0248165 A1 | 9/2013 | Kandasamy | |
| 2013/0333398 A1 | 12/2013 | Wendrock et al. | |
| 2014/0020097 A1 | 1/2014 | Riou | |
| 2014/0023519 A1 | 1/2014 | Li | |
| 2014/0026599 A1* | 1/2014 | Rusignuolo | F25B 49/025 62/56 |
| 2014/0116673 A1 | 5/2014 | Kang et al. | |
| 2014/0137580 A1 | 5/2014 | Peyaud et al. | |
| 2014/0208789 A1 | 7/2014 | Lombardo et al. | |
| 2014/0308138 A1 | 10/2014 | Pham | |
| 2014/0311180 A1 | 10/2014 | Kawakami et al. | |
| 2014/0338376 A1 | 11/2014 | Carpenter et al. | |
| 2015/0013361 A1 | 1/2015 | Senf, Jr. et al. | |
| 2015/0188360 A1 | 7/2015 | Doane et al. | |
| 2015/0224852 A1 | 8/2015 | Wiedemann et al. | |
| 2015/0314671 A1 | 11/2015 | Rajtmajer et al. | |
| 2015/0352925 A1 | 12/2015 | Olyleye et al. | |
| 2016/0033190 A1* | 2/2016 | Kim | F25D 17/045 62/186 |
| 2016/0061504 A1 | 3/2016 | Penn, II et al. | |
| 2016/0144764 A1* | 5/2016 | Dutta | B60P 3/20 62/64 |
| 2016/0144765 A1 | 5/2016 | Viegas et al. | |
| 2016/0159339 A1 | 6/2016 | Cho et al. | |
| 2016/0334154 A1* | 11/2016 | Srichai | F28D 20/02 |
| 2016/0361975 A1 | 12/2016 | Blatchley et al. | |
| 2017/0100987 A1 | 4/2017 | Chopko et al. | |
| 2017/0151859 A1 | 6/2017 | Dykes et al. | |
| 2017/0321678 A1 | 11/2017 | Kolpe | |
| 2017/0321679 A1 | 11/2017 | Devanawar et al. | |
| 2018/0001731 A1 | 1/2018 | Vehr et al. | |
| 2018/0001738 A1 | 1/2018 | Vehr et al. | |
| 2018/0001739 A1 | 1/2018 | Vehr et al. | |
| 2018/0001740 A1 | 1/2018 | Vehr et al. | |
| 2018/0001742 A1 | 1/2018 | Vehr et al. | |
| 2018/0001744 A1 | 1/2018 | Vehr et al. | |
| 2018/0001746 A1 | 1/2018 | Vehr et al. | |
| 2018/0041137 A1 | 2/2018 | Iwata et al. | |
| 2018/0320956 A1 | 11/2018 | Schumacher et al. | |
| 2019/0275866 A1 | 9/2019 | Vehr et al. | |

FOREIGN PATENT DOCUMENTS

| | | |
|---|---|---|
| KR | 101462575 B1 | 11/2014 |
| WO | WO-0049349 A1 | 8/2000 |
| WO | WO-2013165534 A1 | 11/2013 |
| WO | WO-2015090191 A1 | 6/2015 |
| WO | WO-2016147022 A1 | 9/2016 |

OTHER PUBLICATIONS

Non-Final Office Action regarding U.S. Appl. No. 15/635,779 dated Dec. 26, 2018.
Applicant-Initiated Interview Summary regarding U.S. Appl. No. 15/635,249 dated Dec. 28, 2018.
Non-Final Office Action regarding U.S. Appl. No. 15/635,372 dated Jan. 18, 2019.
Applicant-Initiated Interview Summary regarding U.S. Appl. No. 15/635,760 dated Dec. 5, 2018.
Election/Restriction Requirement regarding U.S. Appl. No. 15/635,688, dated Dec. 6, 2018.
Lyon: "An All Electric Refrigerated Truck for Nestlé Switzerland," Renault Trucks Deliver Press Release, Corporate Communications Department; Jun. 2012; 2 Pages.

(56) References Cited

OTHER PUBLICATIONS

Vijayenthiran, Viknesh "Mercedes beats Tesla to electric truck," Motor Authority; FoxNews.com; Published Oct. 11, 2016 <https://www.foxnews.com/auto/mercedes-beats-tesla-to-electric-truck>.
Notice of Allowance and Fees Due regarding U.S. Appl. No. 15/635,760 dated Feb. 20, 2019.
Applicant-Initiated Interview Summary regarding U.S. Appl. No. 15/635,779 dated Feb. 20, 2019.
Election/Restriction Requirement regarding U.S. Appl. No. 15/635,483 dated Apr. 25, 2018.
Non-Final Office Action regarding U.S. Appl. No. 15/635,249 dated Dec. 3, 2018.
Han—2014: "A comparative study of commercial lithium ion battery cycle life in electrical vehicle: Aging mechanism identification", Xuebing Han et al., Journal of Power Sources 251 (2014) 38-54.
Non-Final Office Action regarding U.S. Appl. No. 15/635,760 dated Sep. 14, 2018.
Applicant-Initiated Interview Summary regarding U.S. Appl. No. 15/635,483 dated Oct. 18, 2018.
Non-Final Office Action regarding U.S. Appl. No. 15/635,483, dated Aug. 1, 2018.
U.S. Appl. No. 15/635,249, filed Jun. 28, 2017, Shawn W. Vehr et al.
U.S. Appl. No. 15/635,372, filed Jun. 28, 2017, Shawn W. Vehr et al.
U.S. Appl. No. 15/635,239, filed Jun. 28, 2017, Shawn W. Vehr et al.
U.S. Appl. No. 15/635,483, filed Jun. 28, 2017, Shawn W. Vehr et al.
U.S. Appl. No. 15/635,688, filed Jun. 28, 2017, Shawn W. Vehr et al.
U.S. Appl. No. 15/635,760, filed Jun. 28, 2017, Shawn W. Vehr et al.
U.S. Appl. No. 15/635,779, filed Jun. 28, 2017, Shawn W. Vehr et al.
U.S. Appl. No. 15/583,424, filed May 1, 2017, Kolpe.
U.S. Appl. No. 15/583,491, filed May 1, 2017, Devanawar et al.
International Search Report regarding International Application No. PCT/US2017/040291, dated Sep. 21, 2017.
Written Opinion of the International Searching Authority regarding International Application No. PCT/US2017/040291, dated Sep. 21, 2017.
International Search Report regarding International Application No. PCT/US2017/040326, dated Sep. 21, 2017.
Written Opinion of the International Searching Authority regarding International Application No. PCT/US2017/040326, dated Sep. 21, 2017.
International Search Report regarding International Application No. PCT/US2017/040272, dated Sep. 22, 2017.
Written Opinion of the International Searching Authority regarding International Application No. PCT/US2017/040272, dated Sep. 22, 2017.
International Search Report regarding International Application No. PCT/US2017/040236, dated Oct. 16, 2017.
Written Opinion of the International Searching Authority regarding International Application No. PCT/US2017/040236, dated Oct. 16, 2017.
International Search Report regarding International Application No. PCT/US2017/040200, dated Oct. 16, 2017.
Written Opinion of the International Searching Authority regarding International Application No. PCT/US2017/040200, dated Oct. 16, 2017.
International Search Report regarding International Application No. PCT/US2017/040344, dated Oct. 18, 2017.
Written Opinion of the International Searching Authority regarding International Application No. PCT/US2017/040344, dated Oct. 18, 2017.
International Search Report regarding International Application No. PCT/US2017/040193, dated Oct. 30, 2017.
Written Opinion of the International Searching Authority regarding International Application No. PCT/US2017/040193, dated Oct. 30, 2017.
International Search Report regarding International Application No. PCT/US2017/040310, dated Oct. 30, 2017.
Written Opinion of the International Searching Authority regarding International Application No. PCT/US2017/040310, dated Oct. 30, 2017.
Notice of Allowance regarding U.S. Appl. No. 15/635,483 dated Jan. 10, 2019.
Notice of Allowance regarding U.S. Appl. No. 15/635,249, dated Mar. 29, 2019.
Notice of Allowance regarding U.S. Appl. No. 15/635,760, dated Apr. 2, 2019.
Notice of Allowance regarding U.S. Appl. No. 15/635,239, dated Mar. 15, 2019.
USPTO Office Communication forwarding Applicant-Initiated Interview Summary and Response to 312 Amendment regarding U.S. Appl. No. 15/635,483 dated Apr. 1, 2019.
Non-Final Office Action regarding U.S. Appl. No. 15/635,688 dated May 20, 2019.
Notice of Allowance regarding U.S. Appl. No. 15/635,372 dated May 31, 2019.
Notice of Allowance regarding U.S. Appl. No. 15/635,249, dated Jun. 10, 2019.
Final Office Action regarding U.S. Appl. No. 15/635,779 dated Jul. 3, 2019.
Notice of Allowance regarding U.S. Appl. No. 15/635,372 dated Jul. 12, 2019.
Applicant-Initiated Interview Summary regarding U.S. Appl. No. 15/635,688 dated Aug. 2, 2019.
Notice of Allowance regarding U.S. Appl. No. 16/420,800 dated Feb. 4, 2020.
Supplementary European Search Report for European Application No. EP17821379. dated Jan. 20, 2020.
European Office Action regarding application EP 17821379.9. dated Feb. 21, 2020.
Notice of Allowance regarding U.S. Appl. No. 15/635,779 dated Sep. 23, 2019.
Non-Final Office Action regarding U.S. Appl. No. 16/420,800 dated Oct. 10, 2019.
Notice of Allowance regarding U.S. Appl. No. 15/635,688 dated Oct. 17, 2019.
Notice of Allowance regarding U.S. Appl. No. 15/635,249 dated Nov. 1, 2019.

\* cited by examiner

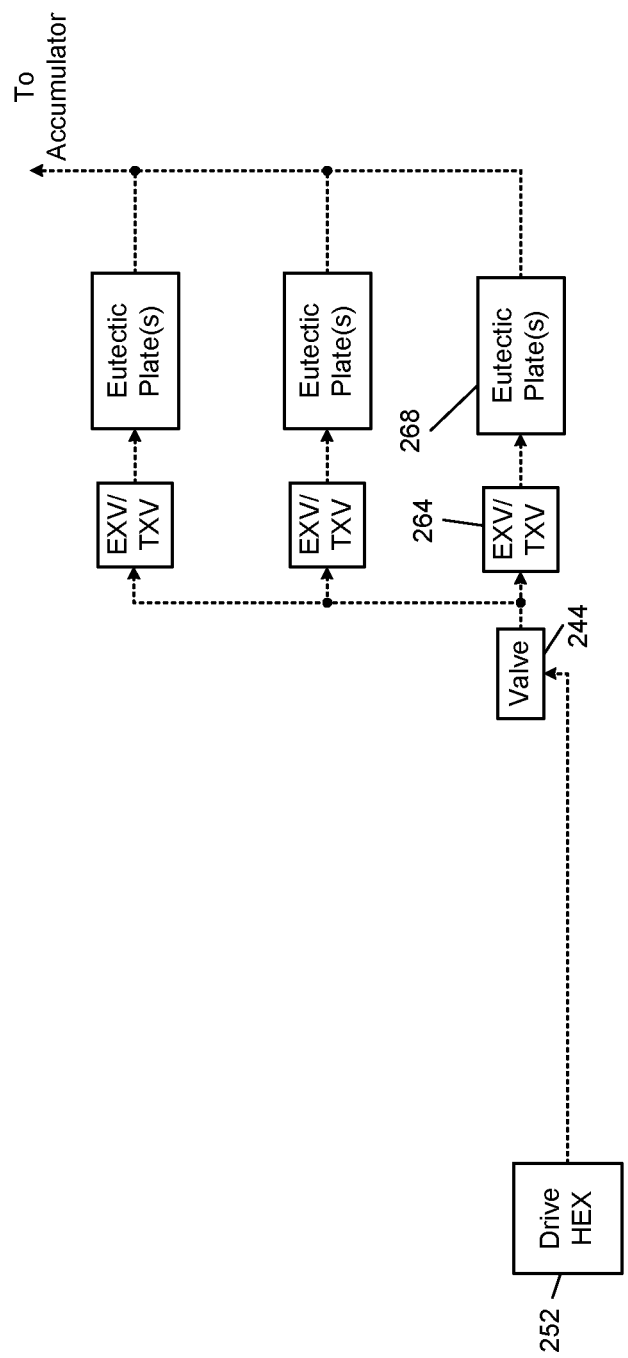

SYSTEM AND METHOD OF MODE-BASED COMPRESSOR SPEED CONTROL FOR REFRIGERATED VEHICLE COMPARTMENT

CROSS-REFERENCE TO RELATED APPLICATIONS

This application claims the benefit of U.S. Provisional Application No. 62/356,631, filed Jun. 30, 2016. The entire disclosure of the application referenced above is incorporated herein by reference.

The entire disclosures of each of the following applications are incorporated herein by reference: U.S. Provisional Application No. 62/356,608, filed Jun. 30, 2016, U.S. Provisional Application No. 62/356,620, filed Jun. 30, 2016; U.S. Provisional Application No. 62/356,626, filed Jun. 30, 2016; U.S. Provisional Application No. 62/356,639, filed Jun. 30, 2016; U.S. Provisional Application No. 62/356,647, filed Jun. 30, 2016; U.S. Provisional Application No. 62/356,652, filed Jun. 30, 2016; and U.S. Provisional Application No. 62/356,666, filed Jun. 30, 2016.

FIELD

The present disclosure relates to vehicles and, more particularly, to refrigeration systems of vehicles.

BACKGROUND

Compressors may be used in a wide variety of industrial and residential applications to circulate refrigerant to provide a desired heating or cooling effect. For example, a compressor may be used to provide heating and/or cooling in a refrigeration system, a heat pump system, a heating, ventilation, and air conditioning (HVAC) system, or a chiller system. These types of systems can be fixed, such as at a building or residence, or can be mobile, such as in a vehicle. Vehicles include land based vehicles (e.g., trucks, cars, trains, etc.), water based vehicles (e.g., boats), air based vehicles (e.g., airplanes), and vehicles that operate over a combination of more than one of land, water, and air.

Small to mid-sized refrigerated truck systems can include eutectic plates. The eutectic plates are disposed within a box of the corresponding truck and are used to maintain an air temperature within the box and thus contents of the box below a predetermined temperature. The eutectic plates are filled with a fluid and are designed to freeze at a certain temperature. The eutectic plates can be cooled to a medium temperature (e.g., 35° F.) or a low temperature (e.g., less than or equal to 0° F.). The refrigerated truck systems typically pull down a temperature of the eutectic plates at night while the truck is parked at a depot. The refrigerated truck systems typically do not run while the truck is in service (i.e. while standing at a site or while traveling between sites). The refrigerated truck systems do not maintain box set point temperatures accurately and therefore are typically used for transporting frozen goods, not fresh goods which require tighter temperature maintenance and set point tolerances.

Some refrigerated truck systems include, in addition to the eutectic plates, a blower/evaporator (hereinafter referred to as an "evaporator"). The evaporator is run as needed and to maintain a temperature within a box of the truck while the corresponding truck is in route between sites. The evaporator is powered by a battery pack, which is charged by solar power or via an alternator and/or generator. The alternator and/or generator are driven by an engine of the truck. While the engine is running, sufficient power is available to run the alternator and/or generator and thus charge the battery pack. However, when the truck is stopped or solar panel output is low, the battery pack is not being charged and the evaporator may not be able to be operated. This inability to operate can cause excessive temperature variation within the box of the truck, which limits the usefulness of the evaporator.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system is provided and includes a mode module, a shore power module, an engine module, and a battery module. The mode module is configured to determine whether to operate in a shore power mode, an engine mode, or a battery mode based on multiple parameters. The shore power module is configured to, while operating in the shore power mode, set a speed of a compressor at a speed based on a temperature within a temperature-controlled container of a vehicle and limit the speed of the compressor to a first speed, where a battery is charged based on received utility power while in the shore power mode. The engine module is configured to, while operating in the engine mode, set the speed of the compressor based on the temperature and limit the speed of the compressor to a second speed, where the battery, while in the engine mode, is charged based on power received from at least one of an electrical source driven by an engine of the vehicle or a solar panel. The electrical source is an alternator or a generator, and where the second speed is less than or equal to the first speed. The battery module is configured to, while operating in the battery mode, set the speed of the compressor based on the temperature and limit the speed of the compressor to a third speed, where, while in the battery mode, the battery is not being charged based on power from (a) a shore power source, and (b) the alternator or the generator from which power is received during the engine mode, and where the third speed is greater than 0 and less than the first speed and the second speed.

In other features, a method is provided that includes: determining whether to operate in a shore power mode, an engine mode or a battery mode based on multiple parameters; and while operating in the shore power mode, setting a speed of a compressor based on a temperature within a temperature-controlled container of a vehicle and limiting the speed of the compressor to a first speed. A battery is charged based on received utility power while in the shore power mode. The method further includes, while operating in the engine mode, setting the speed of the compressor based on the temperature and limiting the speed of the compressor to a second speed. The battery, while in the engine mode, is charged based on power received from at least one of an electrical source driven by an engine of the vehicle or a solar panel. The electrical source is an alternator or a generator. The second speed is equal to or less than the first speed. The method yet further includes, while operating in the battery mode, setting the compressor based on the temperature and limiting the speed of the compressor to a third speed. While in the battery mode, the battery is not being charged based on power from (i) a shore power source, and (ii) the electrical source from which power is received during the engine mode. In some instances, a solar power source provides power during the battery mode. The third speed is greater than 0 and less than the first speed and the second speed.

In yet other features, a system is provided and includes a mode module, a shore power module, an engine module and a battery module. The mode module is configured to determine whether to operate in a shore power mode, an engine mode, or a battery mode based on a plurality of parameters. The shore power module is configured to, while operating in the shore power mode, setting a compressor at a first speed in response to a temperature within a temperature-controlled container of a vehicle being at a predetermined temperature. A first battery is charged based on received utility power while in the shore power mode. In one embodiment, the first battery is charged based on power received from a solar power source (e.g., a solar panel). The engine module configured to, while operating in the engine mode, setting the compressor at a second speed in response to the temperature within the temperature-controlled container being at the predetermined temperature. The first battery, while in the engine mode, is charged based on power received from an electrical source driven by an engine of the vehicle or a solar power source. The electrical source is an alternator or a generator. The second speed is less than or equal to the first speed. The battery module is configured to, while operating in the battery mode, setting the compressor at a third speed in response to the temperature within the temperature-controlled container being at the predetermined temperature. While in the battery mode, the first battery is not being charged based on power from (a) a shore power source, and (b) the alternator or the generator from which power is received during the engine mode. The third speed is greater than 0 and less than the first speed and the second speed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4A includes a functional block diagram of a portion of an example refrigeration system including multiple eutectic plates.

In the drawings, reference numbers may be reused to identify similar and/or identical elements.

DETAILED DESCRIPTION

The examples disclosed herein include adjusting speeds of a compressor, an evaporator fan, and a condenser fan to conserve charge of batteries of a refrigeration system. The compressor, evaporator fan, and condenser fan may be On/Off devices or may be variable speed devices. Speeds of these devices may be switched between a finite set of predetermined speeds or may be set at any number of speeds within respective predetermined ranges. In one embodiment, speeds are reduced while an engine of a truck is OFF and batteries are not being charged or being charged by the solar panels. This reduces power consumption and slows depletion of battery charge. The examples further include accurately maintaining set temperatures within a box (or temperature-controlled container) of a truck during a daily delivery cycle.

The examples include actively switching between two or more operational states. The states include (i) not running refrigerant through either eutectic plates and/or an evaporator, (ii) running refrigerant through the eutectic plates and not the evaporator, (iii) running the refrigerant through the evaporator and not the eutectic plates, and/or (iv) running the refrigerant through both the eutectic plates and the evaporator. In various implementations, the evaporator may be packaged together with an evaporator fan. The speeds of the compressor, evaporator fan, and condenser fan are adjusted prior to, during, and/or subsequent to each of the states based on various parameters.

Figure 1A:
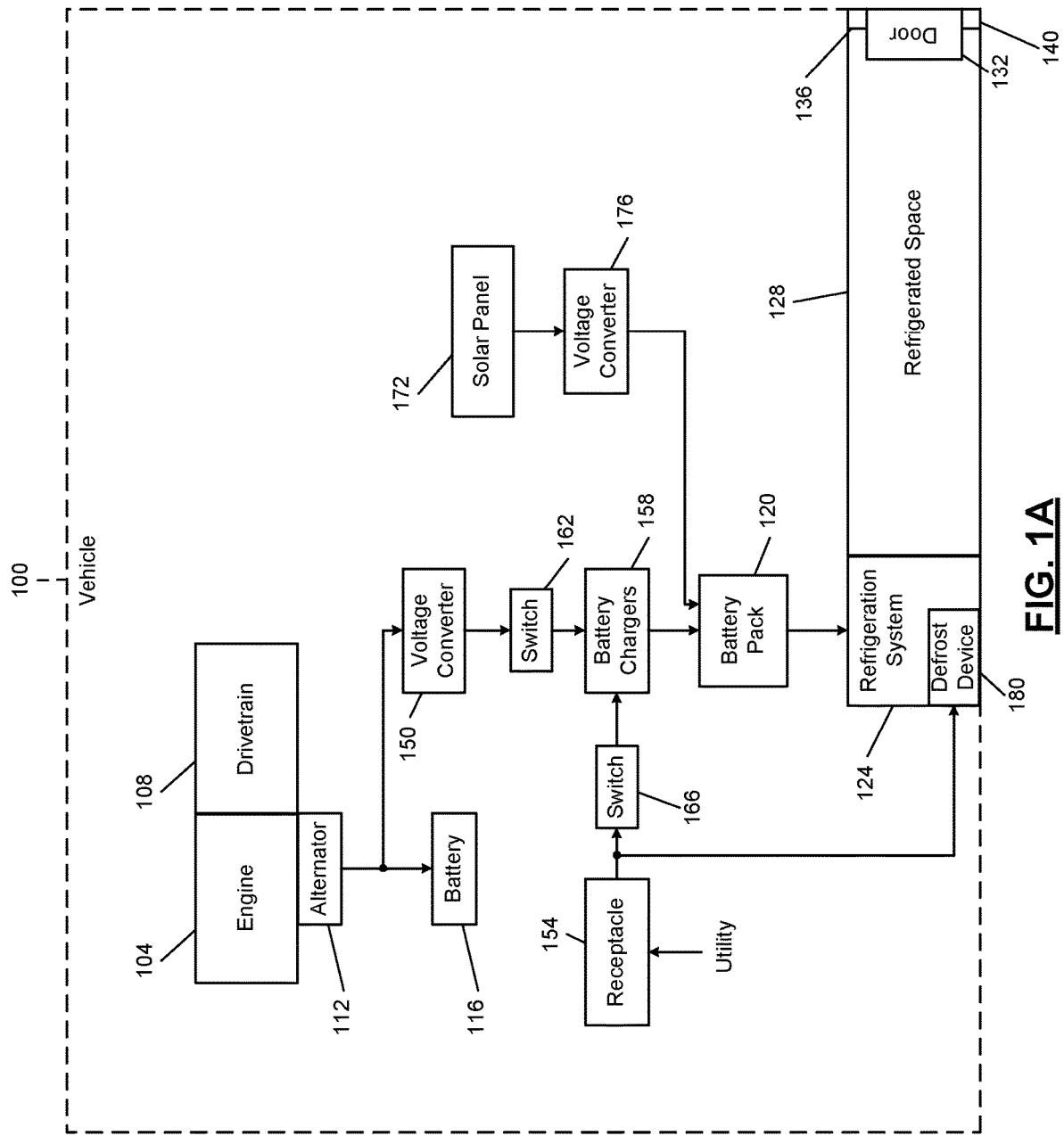
FIGS. 1A and 1B are functional block diagrams of example vehicle systems.
Figure 1B:
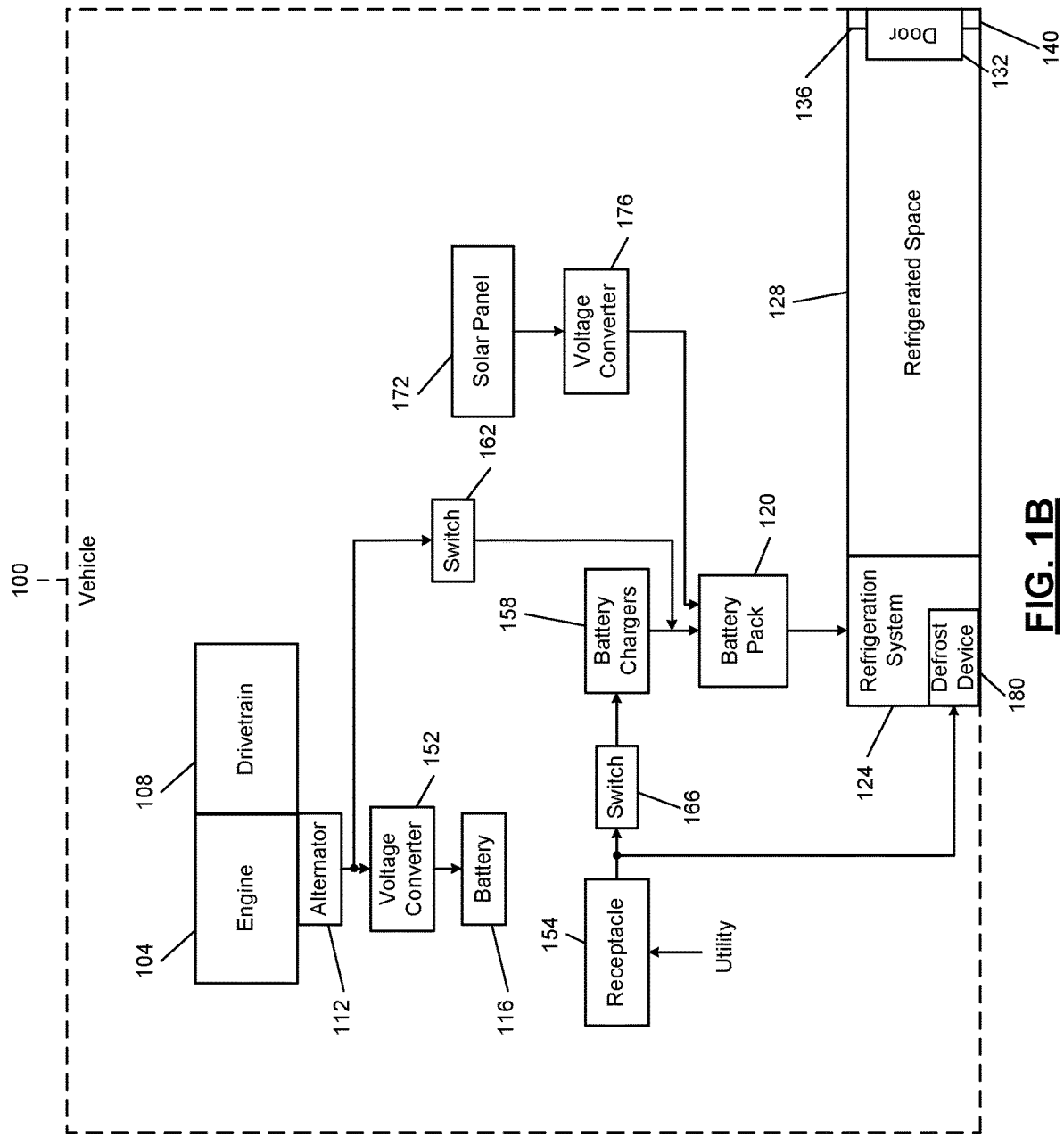

FIGS. 1A and 1B are functional block diagrams of example systems of a vehicle 100. The vehicle 100 includes an internal combustion engine 104 that combusts air and fuel within cylinders to generate propulsion torque for the vehicle 100. The engine 104 may combust, for example, gasoline, diesel fuel, natural gas, and/or one or more other types of fuel. The engine 104 outputs torque to a drivetrain 108. The drivetrain 108 transfers torque to two or more wheels of the vehicle. While the example of a wheeled vehicle is provided, the present application is not limited to vehicles having wheels and is also applicable to water and/or air based vehicles.

An electrical source 112 is driven by the engine 104 and converts mechanical energy of the engine 104 into electrical energy to charge a battery 116. The electrical source 112 may include an alternator, a generator, and/or another type of device that converts mechanical energy of the engine 104 into electrical energy. While the example of a single electrical source is provided, multiple or zero electrical sources driven by the engine 104 may be included. The electrical source 112 may be, for example, a 12 V alternator (e.g., in the example of FIG. 1A) and/or a 48 V alternator (e.g., in the example of FIG. 1B).

The vehicle 100 also includes a battery pack 120. For example only, the battery pack 120 may be a 48 Volt (V) direct current (DC) battery pack, although another suitable battery pack may be used. The battery pack 120 may include two or more individual batteries connected together or may include one battery. For example, in the case of a 48 V battery pack, the battery pack 120 may include four 12 V batteries connected in series. The batteries may be connected such that a lower voltage, such as 12 V, 24 V, and/or 36 V can also be obtained from one, two, or three of the batteries.

Figure 2A:
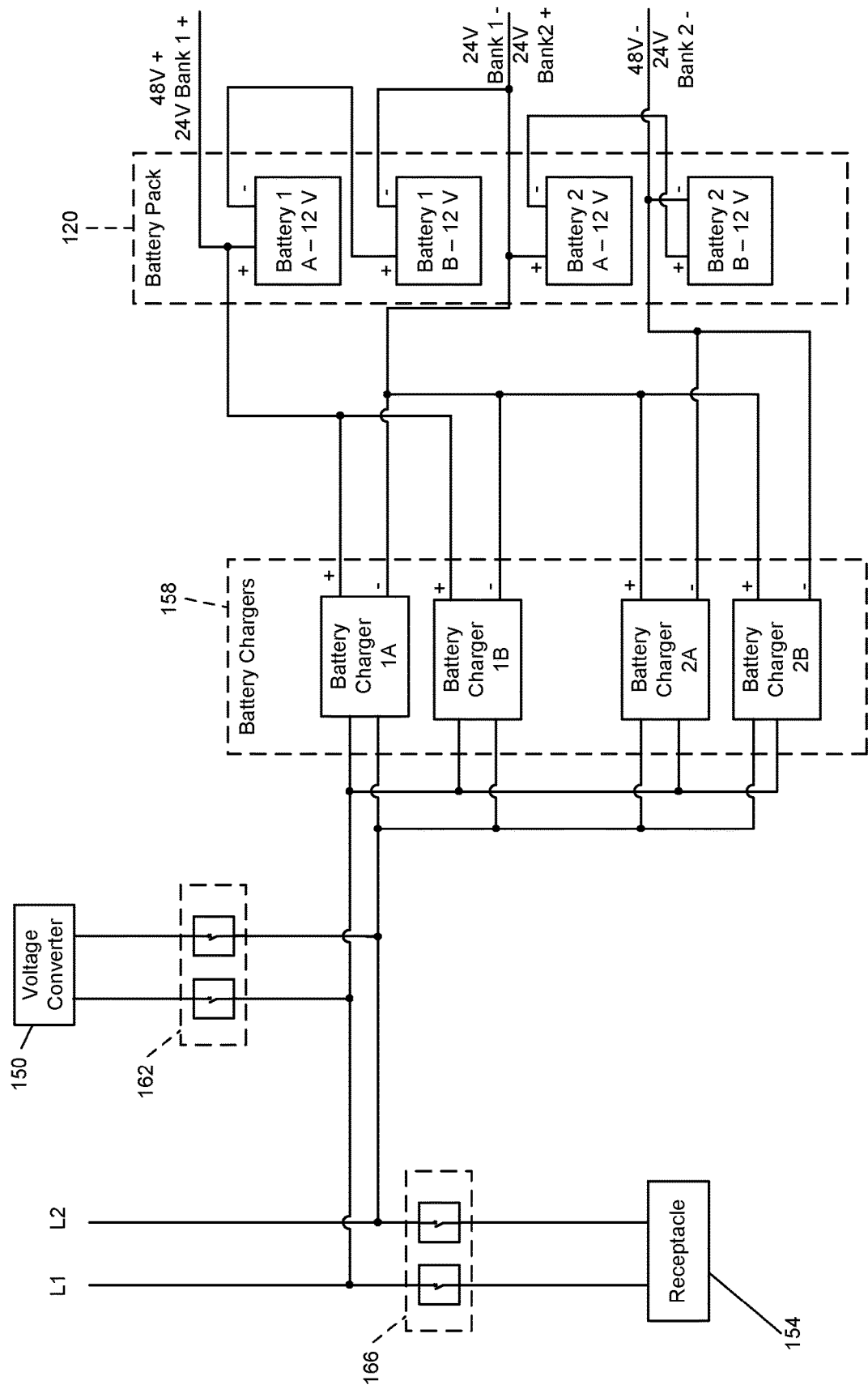
FIGS. 2A and 2B are schematics including a battery pack for a refrigeration system of a vehicle and example charging systems for charging the battery pack.
Figure 2B:
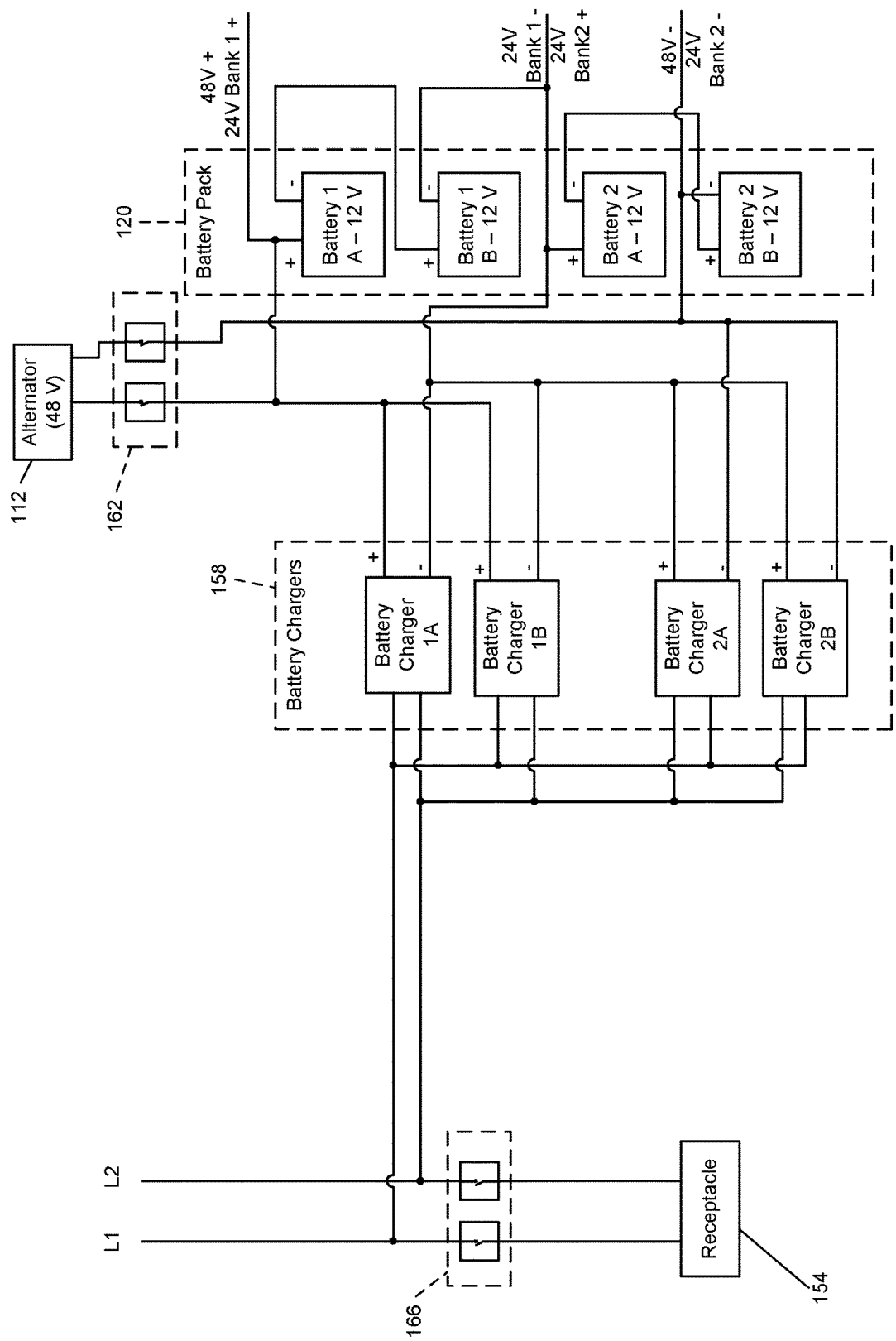

FIGS. 2A and 2B are schematics including examples of the battery pack 120 for a refrigeration system of a vehicle and example charging systems. In the examples of FIGS. 2A and 2B, the battery pack 120 includes four individual 12 V batteries connected in series. The batteries are arranged in two banks (A and B), each bank having two individual 12 V batteries (batteries 1 and 2) connected in series, to provide two 24 V reference potentials.

Referring back to FIGS. 1A and 1B, the battery pack 120 supplies power to a refrigeration system 124. The refrigeration system 124 cools a refrigerated space 128. The refrigerated space 128 may be one refrigerated space that is cooled based on a setpoint temperature. Alternatively, the refrigerated space 128 may be divided (e.g., physically) into multiple refrigerated spaces that may be cooled based on respective setpoint temperatures. For example, a first portion of the refrigerated space 128 may be cooled based on a first setpoint temperature (e.g., for refrigerated items) and a second portion of the refrigerated space 128 may be cooled based on a second setpoint temperature (e.g., for frozen items) that is less than the first setpoint temperature. One example of such a vehicle includes a truck for transporting perishable food items between locations. The refrigerated space(s) may be cooled with a closed loop control system based on temperature(s) within the refrigerated space(s) and the set point temperature(s), respectively.

The vehicle 100 includes a door 132 that provides access to the refrigerated space 128, for example, for loading and unloading of contents of the refrigerated space 128. While the example of one door is provided, the vehicle 100 may include two or more doors. Some vehicles include fourteen (14) or more doors.

An unlock actuator 136 and a lock actuator 140 may unlock and lock the door 132, respectively. The unlock and lock actuators 136 and 140 may, for example, slide a pin out of and into a receiver to lock and unlock the door 132, respectively. An unlock actuator and a lock actuator may be provided with each door to the refrigerated space in various implementations.

A control module (discussed further below) of the refrigeration system 124 may actuate the unlock actuator 136 to unlock the door 132 (and the other doors to the refrigerated space 128) in response to user input to unlock doors of a passenger cabin of the vehicle 100. The control module may actuate the lock actuator 140 to lock the door 132 (and the other doors to the refrigerated space 128) in response to user input to lock the doors of the passenger cabin of the vehicle 100. User input to lock and unlock the doors of the passenger cabin may be provided, for example, via a wireless key fob, a mobile device (e.g., cell phone, tablet, or other handheld device), a remote computer system, and/or one or more lock/unlock switches accessible from within the passenger cabin of the vehicle 100.

The battery pack 120 can be charged using multiple different power sources. For example, in the example of FIG. 1A, the vehicle 100 includes a voltage converter 150 that converts power output by the electrical source 112 (e.g., 12 V) into power for charging the battery pack 120. The voltage converter 150 may convert the DC output of the electrical source 112 into, for example, 240 V alternating current (AC). Since the electrical source 112 is driven by rotation of the engine 104, the electrical source 112 may be used to charge the battery pack 120 when the engine 104 is running.

While the electrical source 112 is shown as providing power for charging both the battery 116 and the battery pack 120, a second electrical source may be used to convert power of the engine 104 into electrical power for the battery pack 120. In that case, the electrical source 112 may be used to charge the battery 116. In various implementations, the voltage converter 150 and a switch 162 may be omitted, and the engine 104 may not be used to charge the battery pack 120. The battery pack 120 may instead be charged via one or more other power sources, such as those discussed further below.

As another example, in the example of FIG. 1B, the electrical source 112 may charge the battery pack 120. In this example, a voltage converter 152 may convert the power output by the electrical source 112 (e.g., 48 V) into power for charging the battery 116. The voltage converter 152 may convert the DC output of the electrical source 112 into, for example, 12 V for the battery 116. Alternatively, however, another electrical source may be used to charge the battery 116. In various implementations, an (engine driven) electrical source for charging the battery pack 120 may be omitted.

The battery pack 120 can be charged using power from a utility received via a receptacle 154. The receptacle 154 is configured to receive AC or DC power. For example, the receptacle 154 may receive AC power from a utility via a power cord (e.g., an extension cord) connected between the receptacle 154 and a wall outlet or charger of a building. The receptacle 154 may be, for example, a single phase 110/120 or 208/240 V AC receptacle or a 3-phase 208/240 V AC receptacle. In various implementations, the vehicle 100 may include both a 110/120 V AC receptacle and a 208/240 V AC receptacle. While the example of the receptacle 154 receiving AC power is provided, the receptacle 154 may alternatively receive DC power from via a power cord. In various implementations, the vehicle 100 may include one or more AC receptacles and/or one or more DC receptacles. Power received from a utility via the receptacle 154 will be referred to as shore power.

The vehicle 100 also includes one or more battery chargers 158. The battery chargers 158 charge the batteries of the battery pack 120 using shore power received via the receptacle 154 (or power output by the voltage converter 150 in the examples of FIGS. 1A and 2A). When the receptacle 154 is connected to shore power, the switch 162 opens (or is opened) to isolate power from the electrical source 112. While the switch 162 is shown illustratively as one switch, the switch 162 may include one, two, or more than two switching devices (e.g., normally closed or normally open relays). In the examples of FIGS. 2A and 2B, the switch 162 is illustrated as including two relays, one relay for each power line.

When the receptacle 154 is connected to shore power and the ignition system of the vehicle 100 is OFF, a switch 166 closes (or is closed) to relay power from the receptacle 154 to the battery chargers 158, and the battery chargers 158 charge the batteries using shore power. While the switch 166 is also shown illustratively as one switch, the switch 166 may include one, two, or more than two switching devices (e.g., normally closed or normally open relays). In the example of FIGS. 2A and 2B, the switch 166 is illustrated as including two relays, one relay for each power line.

When the ignition system of the vehicle 100 is ON, the switch 166 isolates the receptacle 154 from the battery chargers 158. In the examples of FIGS. 1A and 2A, when the ignition system of the vehicle 100 is ON (such that the engine 104 is running and the voltage converter 150 is outputting power to charge the battery pack 120), the switch 162 connects the voltage converter 150 to the battery chargers 158. The battery chargers 158 can then charge the batteries of the battery pack 120 using power output by the voltage converter 150. In the examples of FIGS. 1B and 2B, when the ignition system of the vehicle 100 is ON (such that the engine 104 is running and the electrical source 112 is outputting power), the switch 162 connects the electrical source 112 to the battery pack 120 so the electrical source 112 charges the battery pack 120.

One battery charger may be provided for each battery of the battery pack 120. Two or more battery chargers may be connected in series and/or parallel in various implementations. Each battery charger may convert input power (e.g., shore power or power output by the voltage converter 150) into, for example, 24 V, 40 amp (A) DC power for charging. For example only, the battery chargers 158 may include one model SEC-2440 charger, manufactured by Samlex America Inc., of Burnaby, BC, Canada. In the examples of FIGS. 2A and 2B, two groups of two 24 V, 40 A battery chargers are connected to provide a 48 V, 80 A output for battery charging. While the example of battery chargers having a 24 V, 40 A output is provided, battery chargers having another output may be used, such as one 12 V charger connected to each battery. The battery chargers 158 may also monitor the individual batteries and control application of power to the respective batteries to prevent overcharging.

The vehicle 100 may optionally include a solar panel (or solar panel array) 172 (hereinafter referred to as the "solar panel 172"). The solar panel 172 converts solar energy into electrical energy. While the example of one solar panel is provided, multiple solar panels may be used. A voltage converter 176 converts power output by the solar panel 172 and charges the battery pack 120. In some embodiments, the solar panel 172 and/or other solar power source(s) may be used to charge the battery pack 120 during operation in the various power modes described herein.

As discussed further below, the refrigeration system 124 includes one or more eutectic plates. The eutectic plate(s) are cooled when the vehicle 100 is connected to shore power. When the vehicle 100 is later disconnected from shore power (e.g., for delivery of contents of the refrigerated space 128), the eutectic plate(s) can be used to cool the refrigerated space 128 via power from the battery pack 120. The eutectic plate(s) can also be cooled by the refrigeration system 124 when the vehicle 100 is disconnected from shore power.

By charging the battery pack 120 when the vehicle 100 is connected to shore power (and/or via the solar panel 172), use of the engine 104 to generate power to operate the refrigeration system 124 when the vehicle 100 is disconnected from shore power may be minimized or eliminated. This may decrease fuel consumption (and increase fuel efficiency) of the engine 104 and the vehicle 100.

A defrost device 180 may be used to defrost the eutectic plate(s) when the vehicle 100 is connected to shore power. One example of the defrost device 180 includes a resistive heater that warms air circulated over, around, and/or through the eutectic plate(s), such as by one or more fans. Another example of the defrost device 180 includes a resistive heater that warms a fluid (e.g., a glycol solution) that is circulated over, around, and/or through the eutectic plate(s), such as by one or more pumps. In this way, heat from the warm air or warm fluid defrosts the eutectic plate(s).

Figure 3:
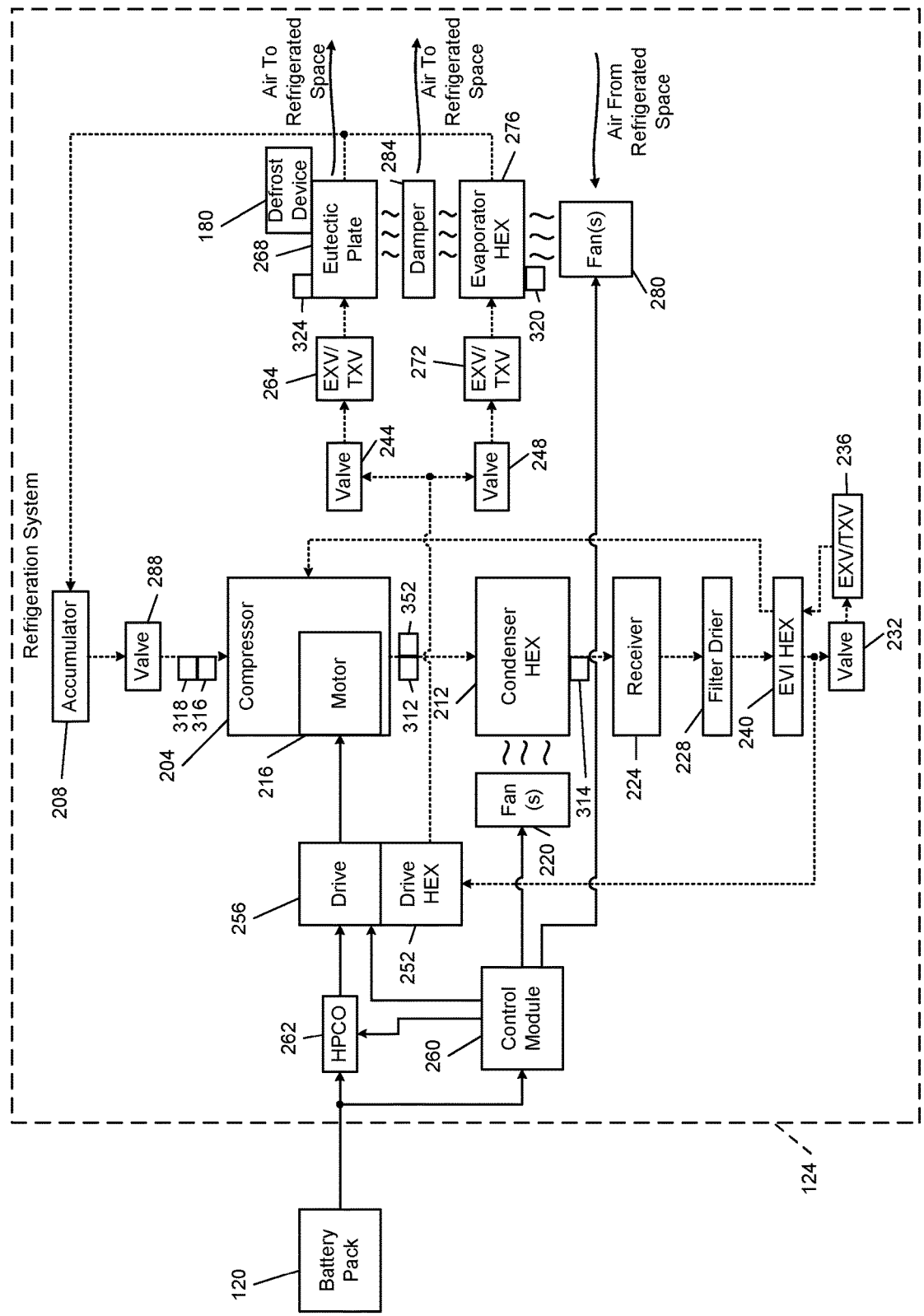
FIG. 3 is a functional block diagram of an example implementation of a refrigeration system of a vehicle including a eutectic plate and an evaporator system. The term "eutectic plate" may include a single plate or multiple plates assembled into a plate bank and referenced as such from this point forward.

FIG. 3 includes a functional block diagram of an example implementation of the refrigeration system 124. In the example of FIG. 3, dotted lines indicate refrigerant flow, while solid lines indicate electrical connections. In various implementations, some, all, or none of the components of the refrigeration system 124 may be located within the refrigerated space 128.

A compressor 204 receives refrigerant vapor from an accumulator 208 via a suction line of the compressor 204. The accumulator 208 collects liquid refrigerant to minimize liquid refrigerant flow to the compressor 204. The compressor 204 compresses the refrigerant and provides pressurized refrigerant in vapor form to a condenser heat exchanger (HEX) 212. The compressor 204 includes an electric motor 216 that drives a pump to compress the refrigerant. For example only, the compressor 204 may include a scroll compressor, a reciprocating compressor, or another type of refrigerant compressor. The electric motor 216 may include, for example, an induction motor, a permanent magnet motor (brushed or brushless), or another suitable type of electric motor. In various implementations, the electric motor 216 may be a brushless permanent magnet (BPM) motor, for example, due to BPM motors being more efficient than other types of electric motors.

All or a portion of the pressurized refrigerant is converted into liquid form within the condenser HEX 212. The condenser HEX 212 transfers heat away from the refrigerant, thereby cooling the refrigerant. When the refrigerant vapor is cooled to a temperature that is less than a saturation temperature of the refrigerant, the refrigerant transitions into liquid (or liquefied) form. One or more condenser fans 220 may be implemented to increase airflow over, around, and/or through the condenser HEX 212 and increase the rate of heat transfer away from the refrigerant.

Refrigerant from the condenser HEX 212 is delivered to a receiver 224. The receiver 224 may be implemented to store excess refrigerant. In various implementations, the receiver 224 may be omitted. A filter drier 228 may be implemented to remove moister and debris from the refrigerant. In various implementations, the filter drier 228 may be omitted.

When an enhanced vapor injection (EVI) valve 232 is open, a portion of the refrigerant may be expanded to vapor form by an expansion valve 236 and provided to an EVI HEX 240. The EVI valve 232 may be, for example, a solenoid valve or another suitable type of valve.

The EVI HEX 240 may be a counter flow plate HEX and may superheat the vapor refrigerant from the EVI valve 232. Vapor refrigerant from the EVI HEX 240 may be provided to the compressor 204, such as at a midpoint within a compression chamber of the compressor 204. EVI may be performed, for example, to increase capacity and increase efficiency of the refrigeration system 124. The EVI valve 232 may include a thermostatic expansion valve (TXV) or an electronic expansion valve (EXV).

The refrigerant not flowing through the EVI valve 232 is circulated to a plate control valve 244 and an evaporator control valve 248. The plate control valve 244 may be, for example, a solenoid valve or another suitable type of valve. The evaporator control valve 248 may be, for example, a solenoid valve or another suitable type of valve.

Before flowing to the plate control valve 244 and the evaporator control valve 248, the refrigerant may flow through a drive HEX 252. The drive HEX 252 draws heat away from a drive 256 and transfers heat to refrigerant flowing through the drive HEX 252. While the example of the drive HEX 252 being liquid (refrigerant) cooled is provided, the drive 256 may additionally or alternatively be air cooled. Air cooling may be active (e.g., by a fan) or passive (e.g., by conduction and convection).

The drive 256 controls application of power to the motor 216 from the battery pack 120. For example, the drive 256 may control application of power to the motor 216 based on a speed command from a control module 260. Based on the speed command, the drive 256 may generate three-phase AC power (e.g., 208/240 V AC) and apply the three-phase AC power to the motor 216. The drive 256 may set one or more characteristics of the three-phase AC power based on the speed command, such as frequency, voltage, and/or current. For example only, the drive 256 may be a variable frequency drive (VFD). In various implementations, one or more electromagnetic interference (EMI) filters may be implemented between the battery pack 120 and the drive 256. In one embodiment, the motor 216 is an induction motor or a permanent magnet motor.

The control module 260 may set the speed command to a plurality of different possible speeds for variable speed operation of the motor 216 and the compressor 204. The control module 260 and the drive 256 may communicate, for example, using RS485 Modbus or another suitable type of communication including, but not limited to, controller area network (CAN) bus or analog signaling (e.g., 0-10V signals).

A high pressure cut off (HPCO) 262 may be implemented to disconnect the drive 256 from power and disable the motor 216 when the pressure of refrigerant output by the compressor 204 exceeds a predetermined pressure. The control module 260 may also control operation of the compressor 204 based on a comparison of the pressure of refrigerant output by the compressor 204. For example, the control module 260 may shut down or reduce the speed of the compressor 204 when the pressure of refrigerant output by the compressor is less than a second predetermined pressure that is less than or equal to the predetermined pressure used by the HPCO 262.

When the plate control valve 244 is open, refrigerant may be expanded to vapor form by an expansion valve 264 and provided to one or more eutectic plate(s) 268. The vapor refrigerant cools the eutectic plate(s) 268 and a solution within the eutectic plate(s) 268. For example only, the solution may be a solution including one or more salts. The solution may have a freezing point temperature of, for example, approximately 12 degrees Fahrenheit or another suitable freezing point temperature. The solution of the eutectic plate(s) 268 may be selected, for example, based on the items typically cooled within the refrigerated space 128. The expansion valve 264 may include a TXV or may be an EXV.

The eutectic plate(s) 268 is located within the refrigerated space 128 and cools the refrigerated space 128. By freezing the solution within the eutectic plate 268(s), the eutectic plate 268 can be used to cool the refrigerated space for a period of time after the freezing, such as while the vehicle 100 is transporting items within the refrigerated space 128.

When the evaporator control valve 248 is open, refrigerant may be expanded to vapor form by an expansion valve 272 and provided to an evaporator HEX 276. The expansion valve 272 may include a TXV or may be an EXV. Like the eutectic plate(s) 268, the evaporator HEX 276 cools the refrigerated space 128. More specifically, the vapor refrigerant within the evaporator HEX 276 transfers heat away (i.e., absorbs heat) from air within the refrigerated space 128.

One or more evaporator fans 280 may draw air from the refrigerated space 128. The evaporator fan(s) 280 may increase airflow over, around, and/or through the evaporator HEX 276 and the eutectic plate(s) 268 to increase the rate of heat transfer away from (i.e., cooling of) the air within the refrigerated space 128. A damper door 284 may be implemented to allow or block airflow from the evaporator fan(s) 280 to the eutectic plate(s) 268. For example, when the damper door 284 is open, the evaporator fan(s) 280 may circulate air past the evaporator HEX 276 and the eutectic plate(s) 268. When the damper door 284 is closed, the damper door 284 may block airflow from the evaporator fan(s) 280 to the eutectic plate(s) 268, and the evaporator fan(s) 280 may circulate air over, around, and/or through the evaporator HEX 276. While the example of the damper door 284 is provided, another suitable actuator may be used to allow/prevent airflow from the evaporator fan(s) 280 to the eutectic plate(s) 268. Alternatively, one or more fans may be provided with the evaporator HEX 276, and one or more fans may be provided with the eutectic plate(s) 268. Refrigerant flowing out of the eutectic plate(s) 268 and the evaporator HEX 276 may flow back to the accumulator 208. Air cooled by the evaporator HEX 276 and the eutectic plate(s) 268 flows to the refrigerated space to cool the refrigerated space 128. While separate cooled air paths are illustrated in the example of FIG. 3, air flowing out of the eutectic plate(s) 268 may be combined with air flowing out of the evaporator HEX 276 before the cooled air is output to cool the refrigerated space 128. Curved lines in FIG. 3 are illustrative of air flow.

The refrigeration system 124 may also include a compressor pressure regulator (CPR) valve 288 that regulates pressure of refrigerant input to the compressor 204 via the suction line. For example, the CPR valve 288 may be closed to limit pressure into the compressor 204 during startup of the compressor 204. The CPR valve 288 may be an electronically controlled valve (e.g., a stepper motor or solenoid valve), a mechanical valve, or another suitable type of valve. In various implementations, the CPR valve 288 may be omitted. In one embodiment, the CPR valve 288 is not included. The CPR valve 288 may be used to limit startup torque of the motor of the compressor 204. The drive 256 limits the torque the motor can pull.

The example of one eutectic plate and one evaporator HEX is provided in FIG. 3. However, the refrigeration system 124 may include more than one eutectic plate, such as two, three, four, five, six, or more eutectic plates. One expansion valve may be provided for each eutectic plate. FIG. 4A includes a functional block diagram of a portion of an example refrigeration system including multiple eutectic plates.

Figure 4B:
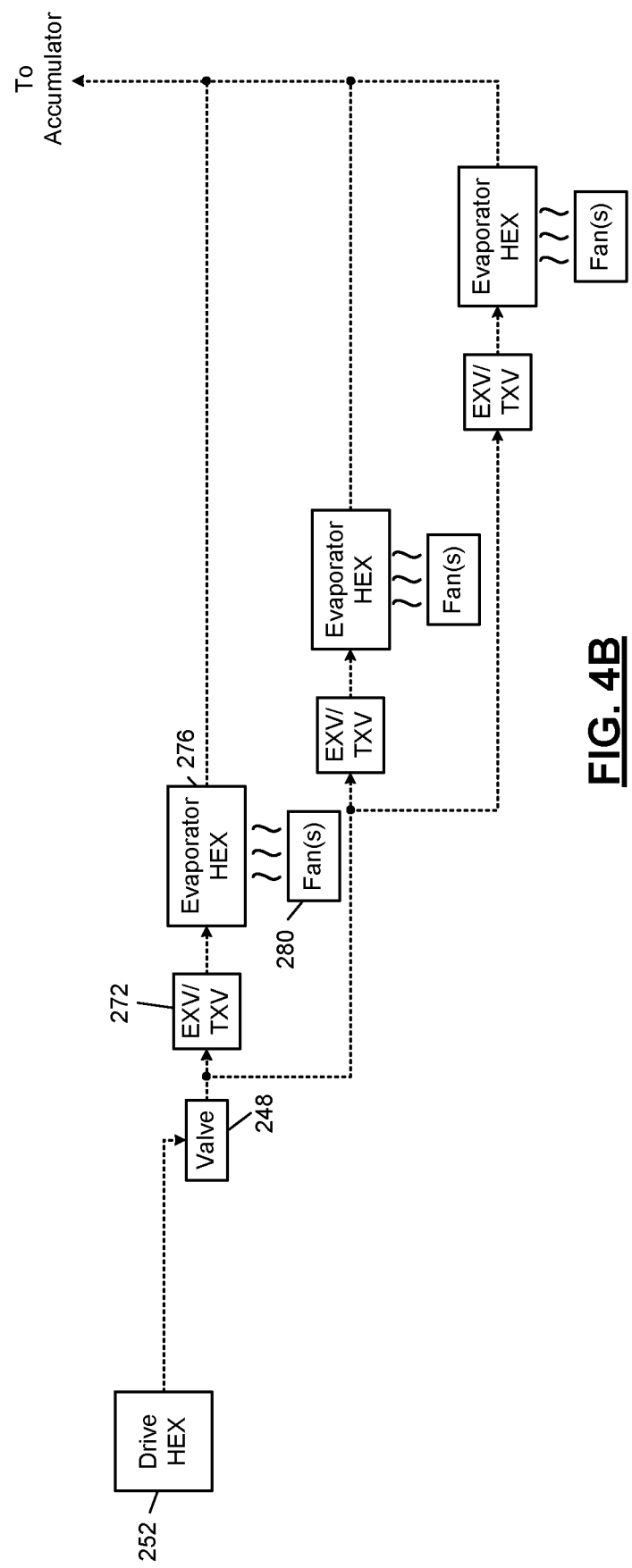
FIG. 4B includes a functional block diagram of a portion of an example refrigeration system including multiple evaporator systems.

Additionally or alternatively to having one or multiple eutectic plates, the refrigeration system 124 may include more than one evaporator HEX, such as two, three, four, five, six, or more evaporator HEXs. For example, different evaporator HEXs may be provided for different sections of the refrigerated space 128. One expansion valve and one or more evaporator fans may be provided for each evaporator HEX. FIG. 4B includes a functional block diagram of a portion of an example refrigeration system including three evaporator HEXes.

Some vehicles may include two or more refrigerated spaces, but only include an evaporator (or multiple) and a eutectic plate (or multiple) in one of the refrigerated spaces. A damper door or another suitable actuator may be provided to open and close the one refrigerated space having the evaporator and eutectic plate to and from one or more other refrigerated spaces not having an evaporator or a eutectic plate (i.e., not having any evaporators and not having any eutectic plates). The control module 260 may control opening and closing of such a damper door or actuator, for example, based on maintaining a temperature within the other refrigerated space based on a setpoint for that other refrigerated space.

Figure 5:
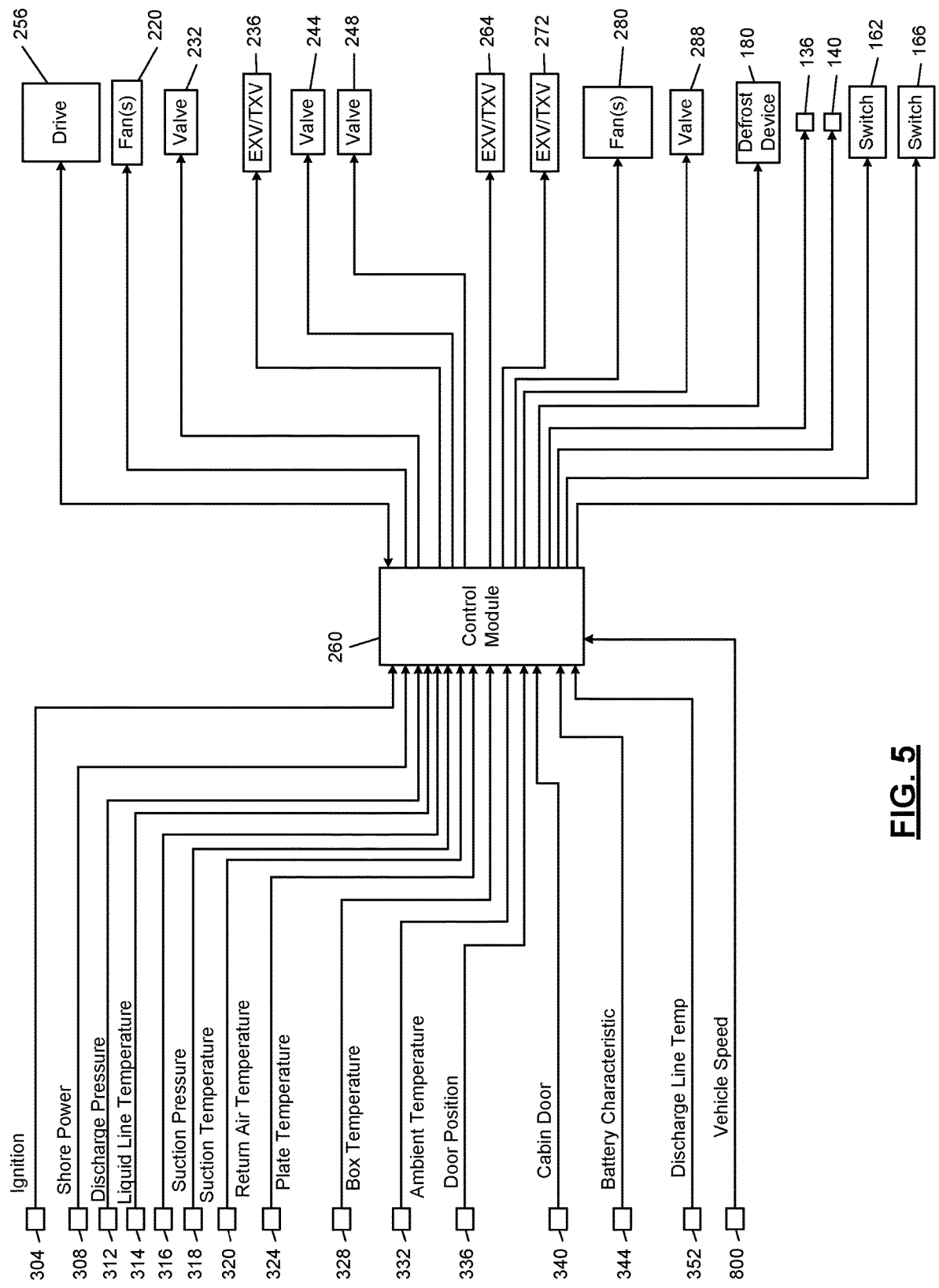
FIG. 5 includes a functional block diagram of an example system including a control module, sensors of the vehicle, and actuators of the vehicle.

FIG. 5 includes a functional block diagram of an example system including the control module 260, various sensors of the vehicle 100, and various actuators of the vehicle 100. The control module 260 receives various measured parameters and indications from sensors of the vehicle 100. The control module 260 controls actuators of the vehicle 100. As an example, the control module 260 may be an iPRO series control module (e.g., 100 series, 200 series, 4 DIN series, 10 DIN series) by Dixell S.r.l., located in Pieve d'Alpago Belluno (BL) Italy. One example is an iPRO IPG115D control module, however, the control module 260 may be another suitable type of control module.

An ignition sensor 304 indicates whether an ignition system of the vehicle 100 is ON or OFF. A driver may turn the ignition system of the vehicle 100 ON and start the engine 104, for example, by actuating an ignition key, button, or switch. The ignition system being ON may indicate that a refrigeration system (discussed further below) is being or can be powered via a charging system powered by the engine 104. A driver may turn the ignition system of the vehicle 100 OFF and shut down the engine 104, for example, by actuating the ignition key, button, or switch.

A shore power sensor 308 indicates whether the vehicle 100 is receiving shore power via the receptacle 154.

A discharge pressure sensor 312 measures a pressure of refrigerant output by the compressor 204 (e.g., in the discharge line). The pressure of refrigerant output by the compressor 204 can be referred to as discharge pressure.

A liquid line temperature sensor 314 measures a temperature of liquid refrigerant output from the condenser HEX 212 (e.g., in the liquid line). The temperature of refrigerant output by the condenser HEX 212 can be referred to as liquid line temperature. The control module 260 may determine a subcooling value based on the liquid line temperature. The control module may determine a refrigerant charge level based on the subcooling value. While one example location of the liquid line temperature sensor 314 is shown, the liquid line temperature sensor 314 may be located at another location where liquid refrigerant is present in the refrigerant path from the condenser HEX 212 to the evaporator HEX 276 (and the eutectic plate 324).

A suction pressure sensor 316 measures a pressure of refrigerant input to the compressor 204 (e.g., in the suction line). The pressure of refrigerant input to the compressor 204 can be referred to as suction pressure.

A suction temperature sensor 318 measures a temperature of refrigerant input to the compressor 204 (e.g., in the suction line). The temperature of refrigerant input to the compressor 204 can be referred to as suction temperature. The control module 260 may determine a superheat value at the compressor 204. The control module 260 may detect and/or predict the presence of a liquid floodback condition based on the superheat value.

A return air temperature sensor 320 measures a temperature of air input to the evaporator HEX 276. The temperature of air input to the evaporator HEX 276 can be referred to as return air temperature (RAT). One return air temperature sensor may be provided for each set of one or more evaporator HEX and one or more eutectic plates.

A plate temperature sensor 324 measures a temperature of the eutectic plate(s) 268. The temperature of the eutectic plate(s) 268 can be referred to as a plate temperature.

A box temperature sensor 328 measures a temperature within the refrigerated space 128. The temperature within the refrigerated space 128 can be referred to as a box temperature. One or more box temperature sensors may be provided and measure a box temperature within each different portion of the refrigerated space 128.

An ambient temperature sensor 332 measures a temperature of ambient air at the location of the vehicle 100. This temperature can be referred to as ambient air temperature. In various implementations, the control module 260 may receive the ambient air temperature from an engine control module (ECM) that controls actuators of the engine 104.

A door position sensor 336 indicates whether the door 132 is closed or open. An indication that the door 132 is open may mean that the door 132 is at least partially open (i.e., not closed), while an indication that the door 132 is closed may mean that the door 132 is fully closed. One or more door position sensors may be provided for each door to the refrigerated space 128.

A cabin door sensor 340 indicates whether the doors of the passenger cabin have been commanded to be locked or unlocked. A driver may command unlocking and locking of the doors of the passenger cabin, for example, via a wireless key fob. As discussed above, the control module 260 may actuate the unlock actuator 136 to unlock the door(s) to the refrigerated space 128 when the driver commands unlocking of the doors passenger cabin. The control module 260 may actuate the lock actuator 140 to lock the door(s) to the refrigerated space 128 when the driver commands locking of the doors of the passenger cabin.

A battery sensor 344 measures a characteristic of a battery of the battery pack 120, such as voltage, current, and/or temperature. In various implementations, a voltage sensor, a current sensor, and/or a temperature sensor may be provided with each battery of the battery pack 120.

A discharge line temperature sensor 352 measures a temperature of refrigerant output by the compressor 204 (e.g., in the discharge line). The temperature of refrigerant output by the compressor 204 can be referred to as discharge line temperature (DLT). In various implementations, the discharge line temperature sensor 352 may provide the DLT to the drive 256, and the drive 256 may communicate the DLT to the control module 260.

Sensors described herein may be analog sensors or digital sensors. In the case of an analog sensor, the analog signal generated by the sensor may be sampled and digitized (e.g., by the control module 260, the drive 256, or another control module) to generate digital values, respectively, corresponding to the measurements of the sensor. In various implementations, the vehicle 100 may include a combination of analog sensors and digital sensors. For example, the ignition sensor 304, the shore power sensor 308, the door position sensor 336 may be digital sensors. The discharge pressure sensor 312, the suction pressure sensor 316, the return air temperature sensor 320, the plate temperature sensor 324, the box temperature sensor 328, the ambient temperature sensor 332, the battery sensor 344, and the discharge line temperature sensor 352 may be analog sensors.

As discussed further below, the control module 260 controls actuators of the refrigeration system 124 based on various measured parameters, indications, setpoints, and other parameters.

For example, the control module 260 may control the motor 216 of the compressor 204 via the drive 256. The control module 260 may control the condenser fan(s) 220. The condenser fan(s) 220 may be fixed speed, and the control module 260 may control the condenser fan(s) 220 to be either ON or OFF. Alternatively, the condenser fan(s) 220 may be variable speed, and the control module 260 may determine a speed setpoint for the condenser fan(s) 220 and control the condenser fan(s) 220 based on the speed setpoint, for example, by applying a pulse width modulation (PWM) signal to the condenser fan(s) 220.

The control module 260 may also control the EVI valve 232. For example, the control module 260 may control the EVI valve 232 to be open to enable EVI or closed to disable EVI. In the example of the expansion valve 236 being an EXV, the control module 260 may control opening of the expansion valve 236.

The control module 260 may also control the plate control valve 244. For example, the control module 260 may control the plate control valve 244 to be open to enable refrigerant flow through the eutectic plate(s) 268 or closed to disable refrigerant flow through the eutectic plate(s) 268. In the example of the expansion valve 264 being an EXV, the control module 260 may control opening of the expansion valve 264.

The control module 260 may also control the evaporator control valve 248. For example, the control module 260 may control the evaporator control valve 248 to be open to enable refrigerant flow through the evaporator HEX 276 or closed to disable refrigerant flow through the evaporator HEX 276. In the example of the expansion valve 272 being an EXV, the control module 260 may control opening of the expansion valve 272.

The control module 260 may receive a signal that indicates whether the HPCO 262 has tripped (open circuited). The control module 260 may take one or more remedial actions when the HPCO 262 has tripped, such as closing one, more than one, or all of the above mentioned valves and/or turning OFF one, more than one, or all of the above mentioned fans. The control module 260 may generate an output signal indicating that the HPCO 262 has tripped when the discharge pressure of the compressor 204 is greater than a predetermined pressure. The control module 260 may enable operation of the refrigeration system 124 after the HPCO 262 closes in response to the discharge pressure falling below than the predetermined pressure. In various implementations, the control module 260 may also require that one or more operating conditions be satisfied before enabling operation of the refrigeration system 124 after the HPCO 262 closes.

The control module may control the evaporator fan(s) 280. The evaporator fan(s) 280 may be fixed speed, and the control module 260 may control the evaporator fan(s) 280 to be either ON or OFF. Alternatively, the evaporator fan(s) 280 may be variable speed, and the control module 260 may determine a speed setpoint for the evaporator fan(s) 280 and control the evaporator fan(s) 280 based on the speed setpoint, for example, by applying a PWM signal to the evaporator fan(s) 280.

In the case of the CPR valve 288 being used and being an electronic CPR valve, the control module 260 may also control the CPR valve 288. For example, the control module 260 may actuate the CPR valve 288 to limit the suction pressure during startup and later open the CPR valve 288.

The control module 260 may also control operation of the defrost device 180 by activating or deactivating the defrost device 180.

The control module 260 may also control the switches 162 and 166. For example, the control module 260 may switch the switch 162 from the closed state to the open state and switch the switch 166 from the open state to the closed state when the ignition system of the vehicle 100 is OFF and shore power is connected to the vehicle 100 via the receptacle 154. The control module 260 may switch the switch 162 from the open state to the closed state and switch the switch 166 from the closed state to the open state when the ignition system of the vehicle 100 is ON. This may be the case regardless of whether shore power is or is not connected to the vehicle 100. The switches 162 and 166 may be active switches, for example, so the control module 260 can ensure that both switches 162 and 166 are not both in the closed state at the same time.

In various implementations, the switches 162 and 166 may be passive devices configured to have opposite open and closed states based on whether shore power is connected to the vehicle 100. For example, the switch 166 may transition to the closed state and the switch 162 may transition to the open state when shore power is connected to the vehicle 100. The switch 166 may transition to the open state and the switch 162 may transition to the closed state when shore power is not connected to the vehicle 100.

Figure 6A:
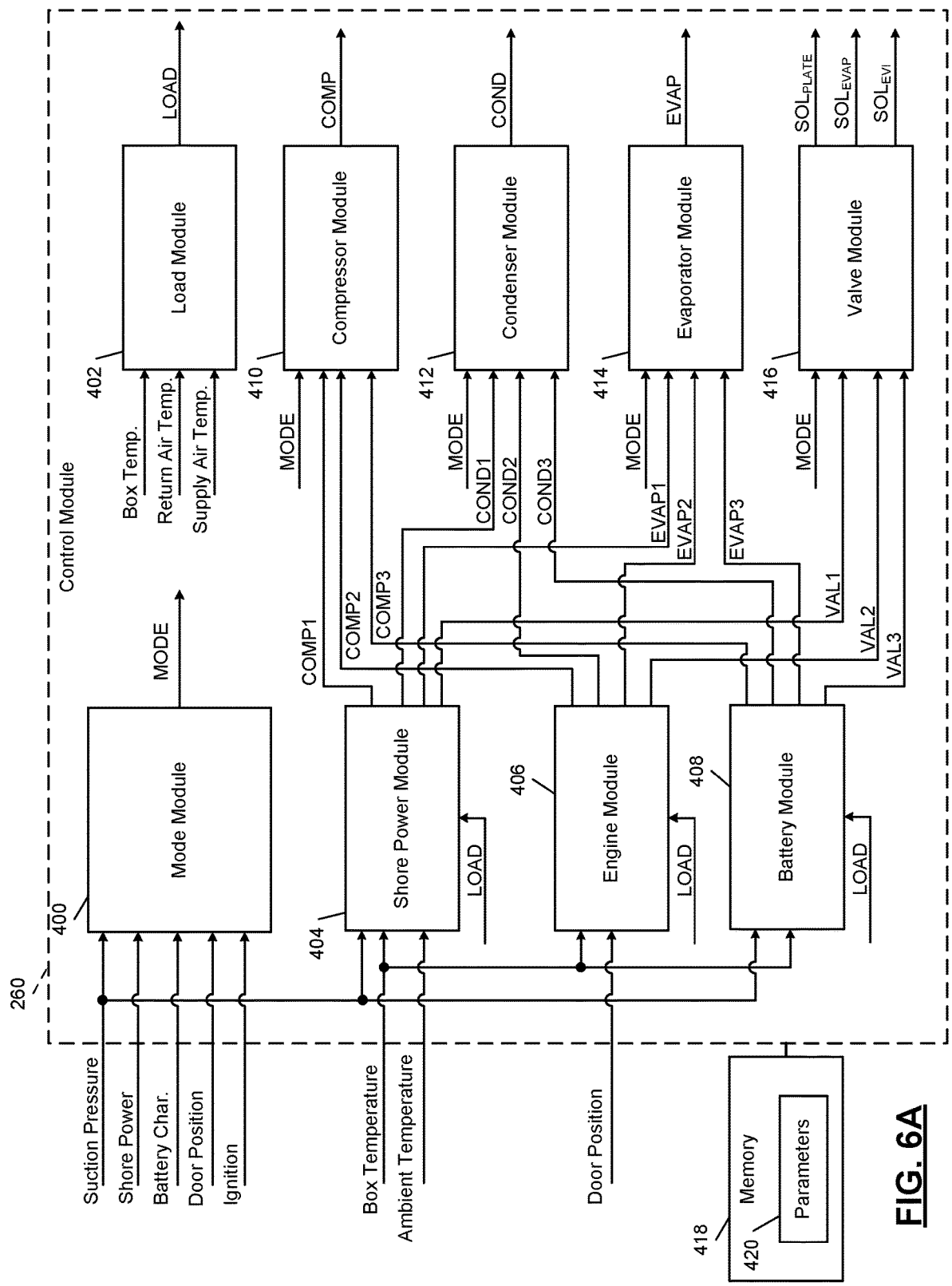
FIG. 6A is a functional block diagram of an example of the control module in accordance with an embodiment of the present disclosure.

FIG. 6A shows an example of the control module 260, which includes a mode module 400, a load module 402, a shore power module 404, an engine module 406, a battery module 408, a compressor module 410, a condenser module 412, an evaporator module 414 and a valve module 416. The modules 260, 400, 402, 404, 404, 406, 408, 410, 412, 414, 416 access data stored in a memory 418. The data includes parameters 420 detected, measured and calculated. The memory may be separate from the control module 260 and/or included in the control module 260. Operation of the modules 260, 400, 402, 404, 404, 406, 408, 410, 412, 414, 416 is described below with respect to the embodiments of FIGS. 7-12.

Figure 6B:
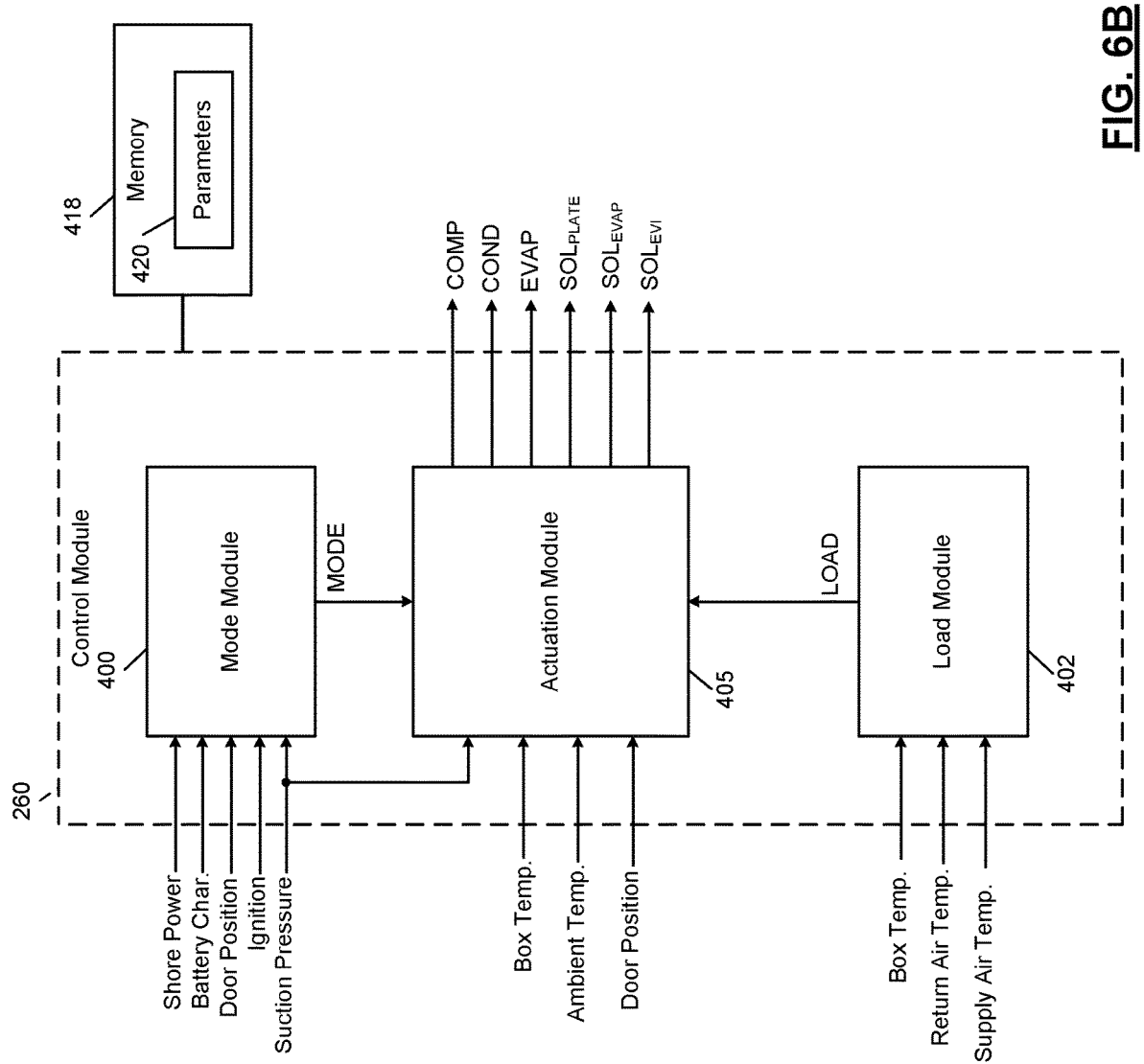
FIG. 6B is a functional block diagram of another example of the control module in accordance with another embodiment of the present disclosure.

As an alternative, FIG. 6B shows another example of the control module 260, which includes the mode module 400, the load module 402, and an actuation module 405. One or more of the modules 404, 406, 408, 410, 412, and 414 of FIG. 6A may be implemented as a single module and/or circuit, as shown in FIG. 6B at 405. In this alternate embodiment, multiple compressor signals (e.g., COMP1, COMP2, COMP3), multiple condenser fan signals (e.g., COND1, COND2, COND3) and multiple evaporator fan signals EVAP1, EVAP2, EVAP3) may not be generated as shown in FIG. 6A and as described below. The actuation module 405 may generate signals COMP, COND, EVAP directly based on input parameters (e.g., suction pressure, box temperature, ambient temperature, door position, compressor load LOAD, etc.).

Figure 7:
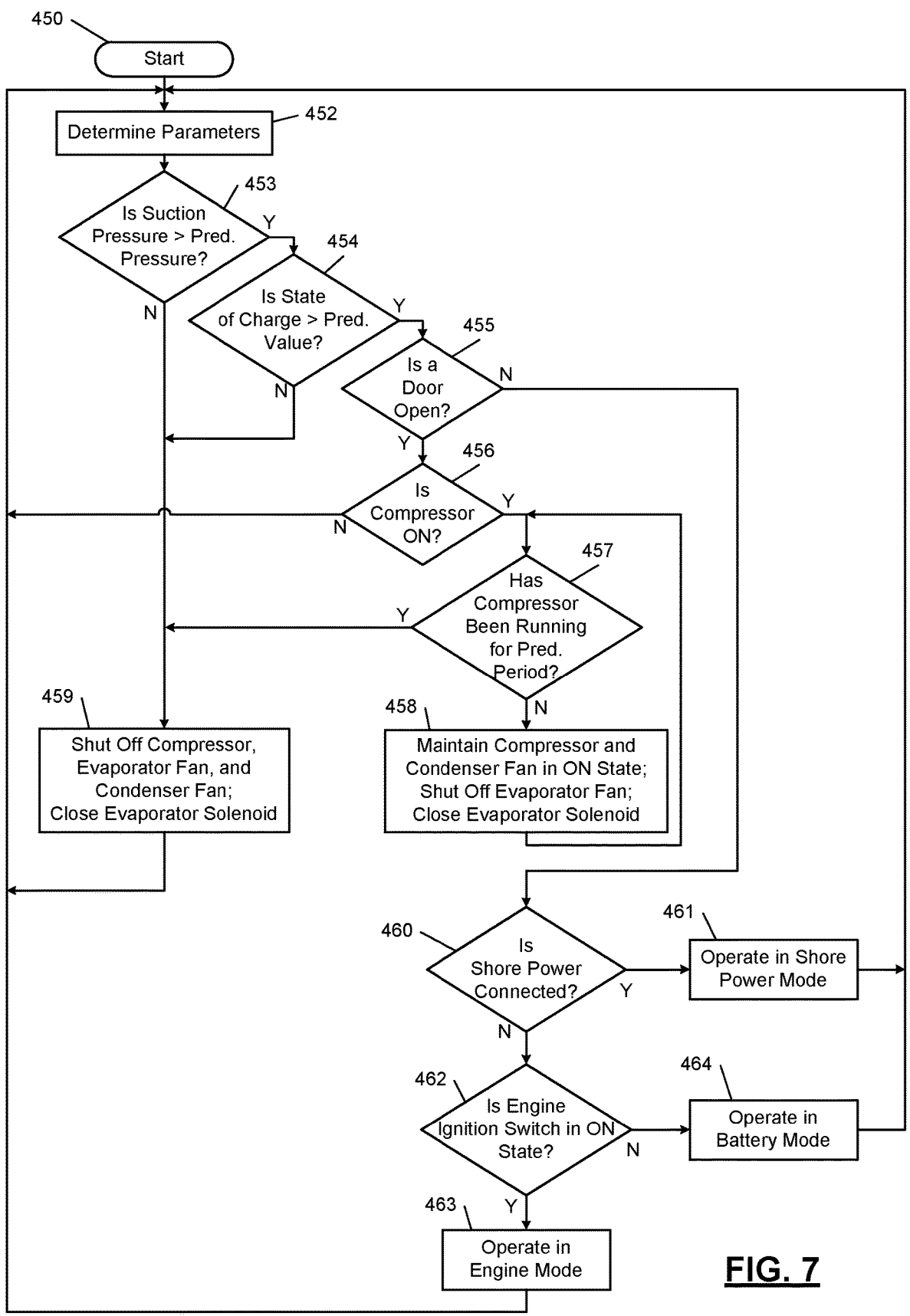
FIG. 7 illustrates a mode selection method in accordance with an embodiment of the present disclosure.

For further defined structure of the modules of FIGS. 5-6B see below provided methods of FIGS. 7-12 and below provided definition for the term "module". The systems disclosed herein may be operated using numerous methods, example methods are illustrated in FIGS. 7-12. In FIG. 7, a mode selection method is shown. Although the following methods are shown as separate methods, one or more methods and/or tasks from separate methods may be combined and performed as a single method. For example, the method of FIG. 7 may be performed in combination with any of the methods of FIGS. 8-12. Although the following tasks are primarily described with respect to the implementations of FIGS. 5-7, the tasks may be easily modified to apply to other implementations of the present disclosure. The tasks may be iteratively performed.

The method may begin at 450. At 452, the control module 260, the mode module 400 and/or the load module 402 determine parameters. This may include receiving sensor signals including parameters, such as suction pressure, a shore power connected indicator, battery characteristics, a door position or state indicator, an ignition or engine ON indicator, an electrical source (e.g., alternator and/or generator) indicator, etc. from corresponding sensors. The shore power signal indicates whether the corresponding vehicle is connected to shore power. The battery characteristic signal may indicate a current charge of one or more batteries in, for example, a battery pack (e.g., the battery pack 120 of FIG. 3). The battery characteristic signal may indicate an overall amount of charge of the battery pack. The battery characteristic signal may also indicate a voltage of one or more batteries and/or an overall voltage of the battery pack.

The door position signal may indicate whether one or more doors of a box that is temperature-controlled are open or closed. The ignition signal, the engine indicator and/or the electrical source indicator may indicate ignition is activated (i.e. spark is activated), an engine is running, and/or the electrical source is charging the battery pack. The ignition signal may indicate whether (i) a key is in an ignition switch and the ignition switch is in an ON position, (ii) a vehicle start switch has been depressed and the vehicle is in an ON state, (iii) a vehicle start switch is in an ON state, and/or (iv) the engine of the vehicle is running (i.e. a fuel system and an ignition system of the engine are activated). The vehicle may be in an ON state and an engine of the vehicle may be OFF. The ignition system of the vehicle is OFF when the engine is OFF.

The load module 402 may receive box temperature, return air temperature, and signals from corresponding sensors indicating temperatures in the box, a return air temperature, and/or a supply air temperature. The load module 402 may determine load on a compressor (e.g., compressor 204 and/or motor 216 of FIG. 5) based on these temperatures. The load module 402 may also determine compressor load based on suction pressure and/or discharge pressor of the compressor. The load module 402 may generate a load signal indicating the LOAD on the compressor. The load may be indicated, for example, in cubic-feet-per-minute (CFM) and/or power drawn by the compressor.

At 453, the mode module 400 determines whether the suction pressure is greater than a predetermined pressure (e.g., 25 pounds per square inch gage (psig)). If the suction pressure is greater than the predetermined pressure, task 454 is performed, otherwise task 459 is performed. At 454, the mode module 400 determines whether a state of charge (e.g., a charge level such as amp-hours or percent of rated capacity and/or voltage of the battery pack) is greater than predetermined value (e.g., if a voltage of the battery pack is greater than 42V). If the state of charge of the battery pack is greater than the predetermined value, then task 455 is performed, otherwise task 459 is performed. At 455, the mode module 400 determines whether one or more doors of the box are closed. If the one or more doors are open then task 456 is performed, otherwise task 460 is performed. Tasks 453, 454, 455 may be performed in a different order, simultaneously and/or during a same period of time.

At 456, the mode module 400 determines whether the compressor 204 is ON. If operating in one of the shore power mode, the engine mode or the battery mode, the mode module 400 continues operating in the one of the shore power mode, the engine mode or the battery mode while performing the method of FIG. 7. If the compressor is ON, then task 457 is performed, otherwise task 452 is performed.

At 457, the mode module 400 determines whether the compressor 204 has been running for more than a predetermined period (e.g., 3 minutes). If the compressor 204 has been running for more than the predetermined period, then task 459, otherwise task 458 is performed. This prevents short cycling the compressor 204.

At 458, the mode module 400 maintains the compressor 204 and the condenser fan 220 in ON State and shuts off the evaporator fan 280 and closes evaporator solenoid 248. This directs coolant to the eutectic plates and not to the evaporator 248. At 459, the compressor 204, evaporator fan 280, and the condenser fan 220 are shut off and the evaporator solenoid 248 is closed.

At 460, the mode module 400 determines whether the vehicle is connected to and receiving shore power from a shore power (or utility power) source. The shore power may be received at battery chargers, a voltage converter, a receptacle, batteries, a power module, and/or the control module 260. Examples of battery chargers, a voltage converter, a receptacle, and batteries are shown in FIG. 2. The shore power signal may indicate when power is received at one or more of the battery chargers, the voltage converter, the receptacle, batteries, the power module, and/or the control module 260. If shore power is received at one or more of the battery chargers, the voltage converter, the receptacle, batteries, the power module, and/or the control module 260, task 461 is performed, otherwise task 462 is performed.

At 461, the control module 260 and the mode module 400 operate in a shore power mode and generate a signal MODE indicating operation in the shore power mode. This may include transitioning from the engine mode or the battery mode to the shore power mode. The method of FIG. 8 may be performed while operating in the shore power mode. The batteries are charged with power received from a utility power source. During the shore power mode, suction pressure of the compressor 204 and box temperature are controlled. This may be different than the battery mode and the engine mode during which box temperature is controlled and suction pressure may not be controlled.

At 462, the mode module 400 determines whether the engine is running based on the ignition signal and/or engine indicator. If the engine is running, task 463 is performed, otherwise task 464 is performed. Although tasks 453, 454, 455, 456, 459 and 461 are shown as being performed in particular order, the tasks 453, 454, 455, 456, 459 and 461 may be performed simultaneously and/or during the same period of time. The mode module 400 may continuously monitor the above-stated parameters associated with tasks 453, 454, 455, 456, 457, 460 and 462 to be able to quickly transition to tasks 458, 459, 461, 463, 464.

At 463, the control module 260 and the mode module 400 operate in an engine mode and generate the signal MODE indicating operation in the engine mode. This may include transitioning from the shore power mode or the battery mode to the engine mode. One or more batteries are charged via an electrical source (e.g., the electrical source 112 of FIG. 1) of the engine during the engine mode. The methods of FIGS. 9 and/or 11 may be performed while operating in the engine mode.

At 464, the control module 260 and the mode module 400 operate in a battery mode and generate the signal MODE indicating operation in the battery mode. This may include transitioning from the shore power mode or the engine mode to the battery mode. The batteries are not charged during the battery mode. While in the battery mode, box temperature is maintained with reduced evaporator fan speed, condenser fan speed, and/or compressor speed to minimize drain on the batteries. The methods of FIGS. 10 and/or 12 may be performed while operating in the battery mode.

While operating in the shore power mode, the engine mode and the battery mode, the method of FIG. 7 may be repeated to determine whether to transition between two of the shore power mode, the engine mode and the battery mode.

The following FIGS. 8-12 show shore power, engine power and battery power methods. The tasks of these methods are provided as examples. Although certain tasks are shown in each of the methods, other tasks may be performed depending on the operation conditions and state of the corresponding systems. For example, the shore power method includes cycling evaporator fan to maintain a box temperature within a predetermined band. As an example, the box temperature may be maintained between the predetermined setpoint temperature and temperature equal to the predetermined setpoint temperature plus 3° F. This fan cycling between ON and OFF states may occur independent of compressor cycling while operating in the shore power mode. The compressor cycling may be based on suction pressure. Also, while in the shore power mode, any time a door of the box is opened and the evaporator fan is commanded to be ON, the evaporator fan solenoid is closed and the evaporator fan is shut OFF. This minimizes an amount of warm air outside the box from entering the box when one or more doors are open. While in the shore power mode, operation of the evaporator fan is resumed when the doors are closed and the evaporator fan is commanded to be ON, for example, due to the box temperature being greater than a predetermined setpoint temperature.

As another example, while operating in the battery power and engine power modes, evaporator fan cycling occurs as described herein. The compressor may be operated/cycled based on box temperature and is subject to minimum ON and OFF times. When the compressor runs, the EVI plate and solenoid valves are open and evaporator and condenser fans are ON. The evaporator fan may be turned OFF when a door of the box is opened and may be cycled or ON when the doors of the box are closed. The evaporator fan may be cycled independent of whether the compressor is OFF.

Figure 8:
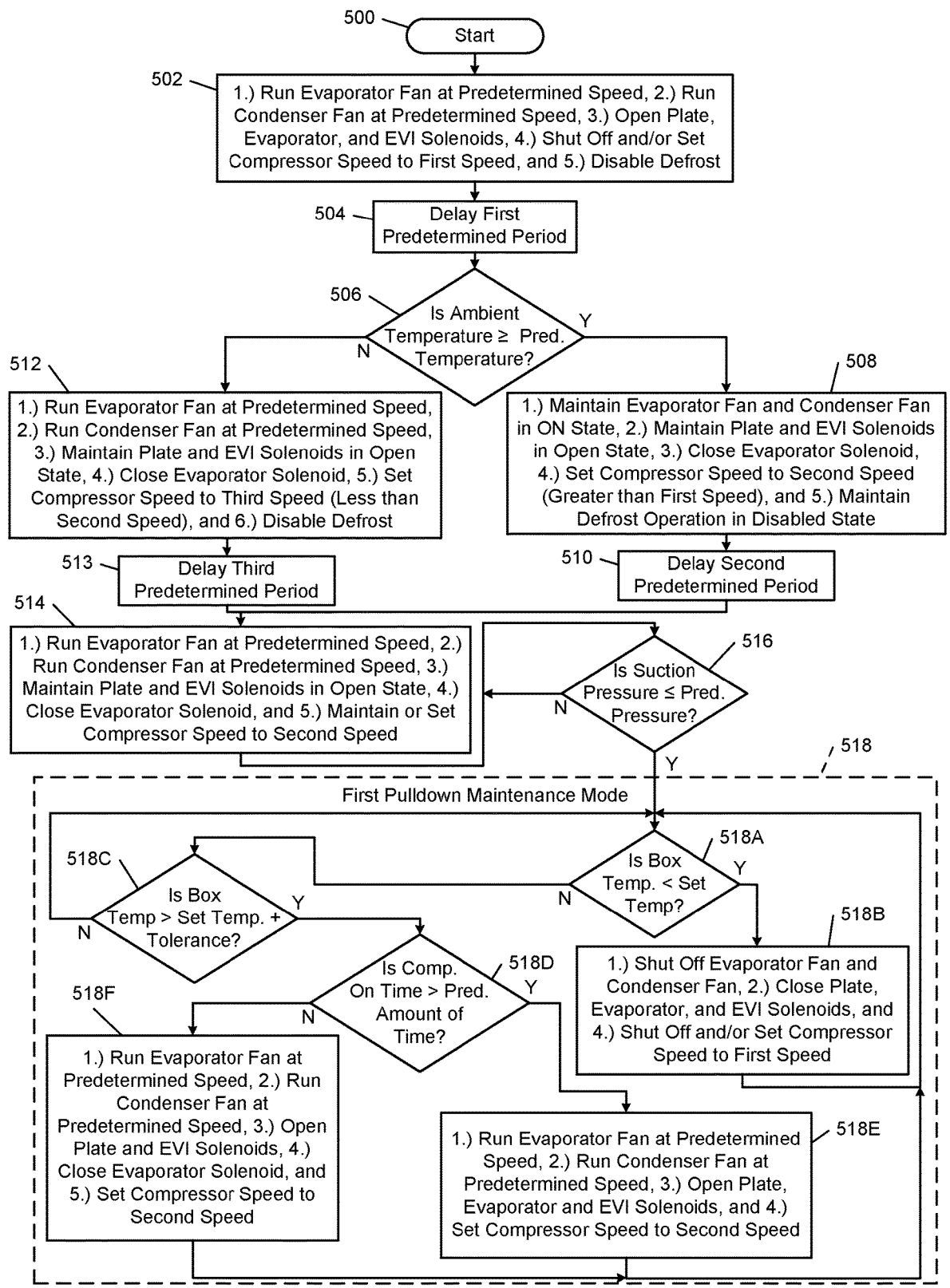
FIG. 8 illustrates a shore power method in accordance with an embodiment of the present disclosure.

FIG. 8 shows a shore power method. Although the following tasks are primarily described with respect to the implementations of FIGS. 5-6 and 8, the tasks may be easily modified to apply to other implementations of the present disclosure. The tasks may be iteratively performed.

The method may begin at 500. At 502, the shore power module 404 performs a start sequence including generating a compressor signal COMP1, a condenser signal COND1, an evaporator signal EVAP1, and a valve signal VAL1 to (i) set a speed of the compressor to a first predetermined speed (e.g., 0% ON (or OFF) and 0 revolutions-per-minute (RPM)), (ii) turn ON an evaporator fan and a condenser fan (e.g., fans 380, 220 of FIG. 5), (iii) if not already open, open plate, evaporator and EVI solenoids (e.g., solenoids 244, 248, 232 of FIG. 5), and (iv) if not already OFF, turn OFF defrost. Turning OFF defrost may include, for example, turning OFF defrost device 180 of FIG. 5 or disabling other defrost operations, which may include a glycol (or coolant/fluid) defrost procedure, a heat pump cycle, etc. The speed of the evaporator fan and the condenser fan may be at predetermined speeds or a full ON (100%) speed. The compressor, evaporator fan, and condenser fan may be multi-speed and/or variable speed devices. The signals COMP1, COND1, EVAP1 may be generated based on the signal LOAD.

The compressor module 410, the condenser module 412, the evaporator module 414, and the valve module 416 generate signals COMP, COND, EVAP, $SOL_{PLATE}$, $SOL_{EVAP}$, $SOL_{EVI}$ to control operation, speed, and/or position of the compressor, the condenser fan, the evaporator fan and the plate, evaporator and EVI solenoids based respectively on the signals COMP1, COND1, EVAP1 and VAL1. The signals COMP, COND, EVAP control operation of the compressor, the condenser fan and the evaporator fan. The signals $SOL_{PLATE}$, $SOL_{EVAP}$, $SOL_{EVI}$ respectively set positions of the plate, evaporator and EVI solenoids. The signals COMP1, COND1, EVAP1 and VAL1 are also generated based on the operating mode indicated by signal MODE. The speeds of the compressor and evaporator fan may be adjusted based on the load of the compressor while operating in the shore power mode.

At 504, the shore power module 404 may delay a predetermined period (e.g., 10 seconds) prior to proceeding to task 506. The predetermined period may be greater than or equal to 0 seconds. The shore power module 404 waits the predetermined period to assure that none of the cooling fluid lines of the corresponding refrigeration system are blocked.

At 506, the shore power module 404 determines whether the ambient temperature is greater than a predetermined temperature (e.g., 100° F.). If the ambient temperature is greater than the predetermined temperature, task 508 is performed, otherwise task 512 is performed.

At 508, the shore power module 404 generates the signals COMP1, COND1, EVAP1, and VAL1 to (i) set the speed of the compressor to a second predetermined speed (e.g., 56% ON and/or 3024 RPM or 100% ON and/or 5400 rpm), (ii) maintain the evaporator fan and the condenser fan in ON states (i.e. operating at speeds greater than 0 RPM), (iii) maintain plate and EVI solenoids in an open state, (iv) close the evaporator solenoid, and (v) maintain defrost operation in a disabled state.

At 510, the shore power module 404 may delay a second predetermined period (e.g., 60 minutes) prior to performing task 514. The shore power module 404 waits the second predetermined period, such that the system operates according to the settings of task 508 for the second predetermined period and to assure that no nuisance trips have occurred and a drive (e.g., the drive 256 of FIG. 3) of the compressor is not overheating.

At 512, the shore power module 404 generates the signals COMP1, COND1, EVAP1, and VAL1 to (i) set the speed of the compressor to a third predetermined speed (e.g., 34% ON and/or 1836 RPM), (ii) maintain the evaporator fan and the condenser fan in ON states (i.e. operating at speeds greater than 0 RPM), (iii) maintain plate and EVI solenoids in an open state, (iv) close the evaporator solenoid, and (v)

maintain defrost operation in a disabled state. Task 512 may be performed for a third predetermined period (e.g., 2 minutes) at 513. This allows the compressor to run at a lower speed for a predetermined period of time prior to being run at a higher or full ON (or maximum) speed (e.g., 100% and/or 5400 RPM). Operation of the compressor at a reduced speed for the predetermined period can prevent oil leakage from the compressor.

At 514, the shore power module 404 generates the signals COMP1, COND1, EVAP1, and VAL1 to (i) set the speed of the compressor to the second predetermined speed (e.g., a speed greater than the third speed, 56% ON, and/or 100% ON), (ii) maintain the evaporator fan and the condenser fan in ON states (i.e. operating at speeds greater than 0 RPM), (iii) maintain plate and EVI solenoids in an open state, (iv) maintain the evaporator solenoid in a closed state, and (v) maintain defrost operation in a disabled state.

At 516, the shore power module 404 determines whether the suction pressure is less than or equal to the predetermined (or set point) pressure (e.g., 25 psig). If the suction pressure is less than the predetermined pressure, task 518 is performed.

At 518, the control module 260, while operating in the shore power mode, operates in a first pulldown maintenance mode. While operating in the first pulldown maintenance mode the compressor 204 is operated based on suction pressure and/or temperature of the eutectic plates to pull down temperature of the eutectic plates. The temperature of the eutectic plates may be estimated based on the suction pressure. The suction pressure may be controlled to decrease temperature of the eutectic plates to a predetermined temperature (e.g., a saturation temperature of −10° F., which may correspond to 25 psi of suction pressure). The box temperature may be maintained at a predetermined set point temperature (e.g., 33-35° F.) while the temperature of the eutectic plates is reduced. The suction pressure of the eutectic plates may be maintained within a predetermined range (e.g., 25-45 psi).

At 518A, the shore power module 404 determines whether the box temperature (temperature of air within the box) is less than a predetermined set point temperature (e.g., 33-35° F.). If the box temperature is less than the predetermined set point temperature, then task 518B is performed, otherwise task 518C is performed.

At 518B, the shore power module 404 generates the signals COMP1, COND1, EVAP1, and VAL1 to (i) set the speed of the compressor to the first predetermined speed (e.g., 0% or OFF), (ii) shuts off the evaporator fan and the condenser fan, and (iii) closes the plate, evaporator, and EVI solenoids.

At 518C, the shore power module 404 determines whether the box temperature is greater than a sum of the predetermined set point temperature and a tolerance value (e.g., 0-3° F.). If the box temperature is greater than the sum, the box temperature is out of a predetermined range of the set point temperature and task 518D is performed, otherwise the box temperature is referred to as being "in range" and task 518A is performed. The tolerance prevents short cycling the compressor (that is, maintaining the compressor in an ON state for less than a minimum run time).

At 518D, the shore power module 404 determines whether the compressor has been ON (operating at a speed greater than a predetermined speed) for a predetermined amount of time (e.g., 3 minutes). If the compressor has been ON for more than the predetermined amount of time, task 518E is performed, otherwise task 518F is performed. As an example, when the compressor has been operating at greater than or equal to 56% for at least 3 minutes, then task 518E is performed.

At 518E, the shore power module 404 generates the signals COMP1, COND1, EVAP1, and VAL1 to (i) set the speed of the compressor to the second and/or other predetermined speed (e.g., a speed greater than the third speed and/or 56%-100% ON), (ii) runs the evaporator and condenser fans at predetermined speeds (e.g., speeds greater than 0 rpm and may be based on compressor load), and (iii) opens the plate, evaporator and EVI solenoids.

At 518F, the shore power module 404 generates the signals COMP1, COND1, EVAP1, and VAL1 to (i) set the speed of the compressor to the second and/or other predetermined speed (e.g., a speed greater than the third speed and/or 56%-100% ON), (ii) runs the evaporator and condenser fans at predetermined speeds (e.g., speeds greater than 0 rpm and may be based on compressor load), (iii) opens the plate, evaporator and EVI solenoids, and (iv) closes the evaporator solenoid. The evaporator solenoid is closed, such that the interior of the box is not being actively cooled, but rather eutectic plates are being cooled. Task 518A may be performed subsequent to performing tasks 518B, 518E, 518F.

Although certain example compressor ON percentages and speeds are provided for some of the above-described tasks, other compressor ON percentages and/or speeds may be implemented. The percentages and speeds may be determined based on the compressor load.

During the shore power mode and/or the first pulldown maintenance mode, if one or more doors of the box are opened, the evaporator fan is shut off and the evaporator solenoid is closed. This minimizes an amount of warm air outside the box from entering the box when one or more doors are open.

Figure 9:
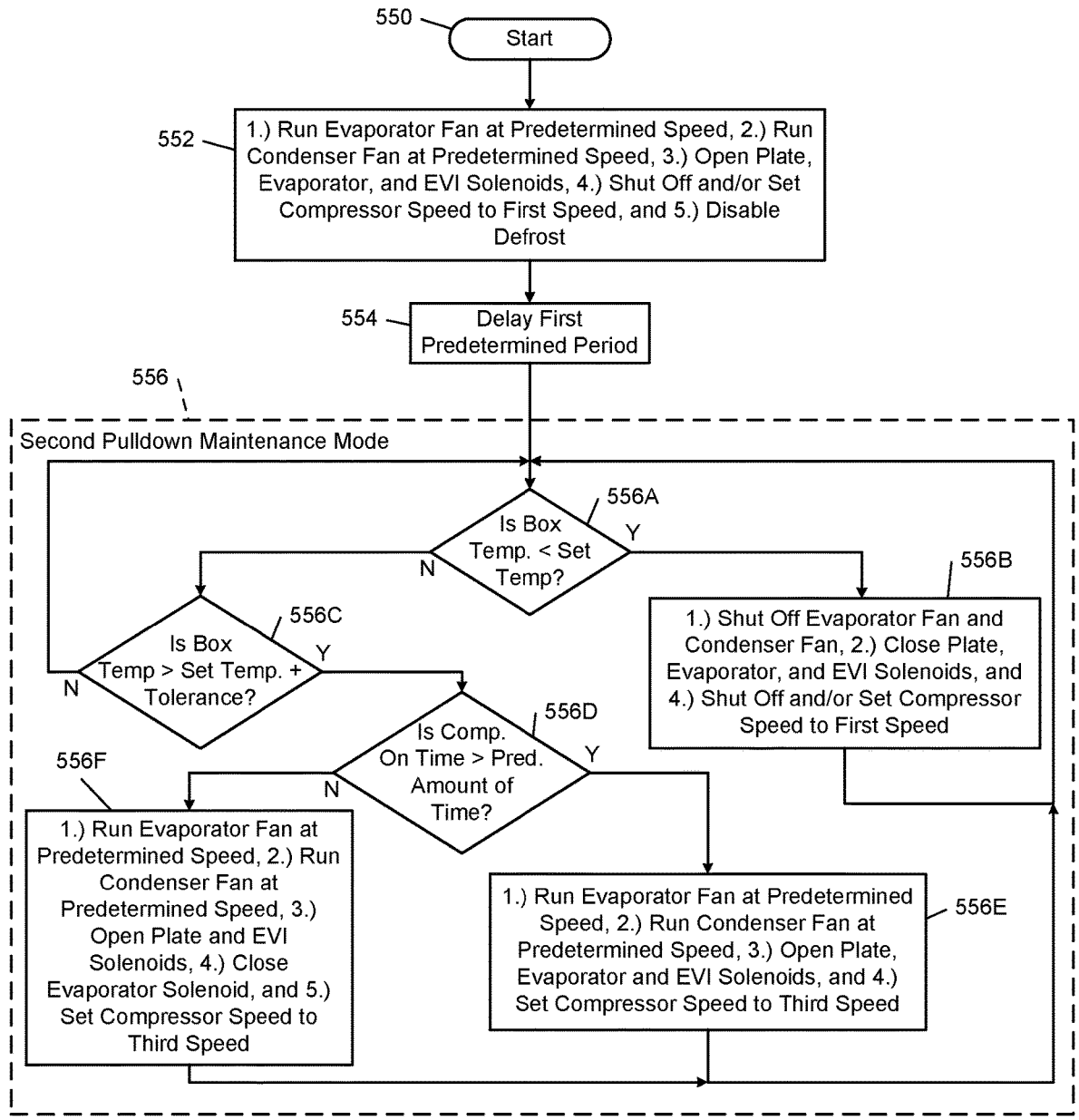
FIG. 9 illustrates an engine method in accordance with an embodiment of the present disclosure.

FIG. 9 shows an engine method. Although the following tasks are primarily described with respect to the implementations of FIGS. 5-6 and 9, the tasks may be easily modified to apply to other implementations of the present disclosure. The tasks may be iteratively performed.

The method may begin at 550. At 552, the engine module 406 performs a start sequence including generating the signals COMP2, COND2, EVAP2, and VAL2 to (i) set the speed of the compressor to a first predetermined speed (e.g., 0% ON (or OFF) and 0 revolutions-per-minute (RPM)), (ii) turn ON an evaporator fan and a condenser fan (e.g., fans 380, 220 of FIG. 5), (iii) if not already open, open plate, evaporator and EVI solenoids (e.g., solenoids 244, 248, 232 of FIG. 5), and (iv) if not already OFF, turn OFF defrost. The speed of the evaporator fan and the condenser fan may be at predetermined speeds or a full ON (100%) speed. The compressor, evaporator fan, and condenser fan may be multi-speed and/or variable speed devices. The signals COMP2, COND2, EVAP2 may be generated based on the signal LOAD.

The compressor module 410, the condenser module 412, the evaporator module 414, and the valve module 416 generate the signals COMP, COND, EVAP, $SOL_{PLATE}$, $SOL_{EVAP}$, $SOL_{EVI}$ to control operation, speed, and/or position of the compressor, the condenser fan, the evaporator fan and the plate, evaporator and EVI solenoids based respectively on the signals COMP2, COND2, EVAP2 and VAL2. The signals COMP2, COND2, EVAP2 and VAL2 are also generated based on the operating mode indicated by signal MODE. The speeds of the compressor and evaporator fan may be adjusted based on the load of the compressor while operating in the engine mode.

At 554, the engine module 406 may delay a predetermined period (e.g., 10 seconds) prior to proceeding to task 556. The predetermined period may be greater than or equal to 0 seconds. The engine module 406 waits the predetermined period to assure that none of the cooling fluid lines are blocked.

At 556, the control module 260, while operating in the engine mode, operates in a second pulldown maintenance mode. At 556A, the engine module 404 determines whether the box temperature is less than a predetermined set point temperature (e.g., 33-35° F.). If the box temperature is less than the predetermined set point temperature, then task 556B is performed, otherwise task 556C is performed.

At 556B, the engine module 404 generates the signals COMP2, COND2, EVAP2, and VAL2 to (i) set the speed of the compressor to the first predetermined speed (e.g., 0% or OFF), (ii) shuts off the evaporator fan and the condenser fan, (iii) closes the plate, evaporator and EVI solenoids.

At 556C, the engine module 404 determines whether the box temperature is greater than a sum of the predetermined set point temperature and a tolerance value (e.g., 0-3° F.). If the box temperature is greater than the sum, the box temperature is out of a predetermined range of the predetermined set point temperature and task 556D is performed, otherwise the box temperature is referred to as being "in range" and task 556A may be performed. The tolerance prevents short cycling the compressor by assuring the compressor is maintained in an ON state for a minimum run time.

At 556D, the engine module 404 determines whether the compressor has been ON (operating at a speed greater than a predetermined speed) for a predetermined amount of time (e.g., 3 minutes). If the compressor has been ON for more than the predetermined amount of time, task 556E is performed, otherwise task 518F is performed. As an example, when the compressor has been operating at greater than or equal to 56% for at least 3 minutes, then task 518E is performed.

At 556E, the engine module 404 generates the signals COMP2, COND2, EVAP2, and VAL2 to (i) set the speed of the compressor to the second and/or other predetermined speed (e.g., a speed greater than the third speed and/or 56%-100% ON), (ii) runs the evaporator and condenser fans at predetermined speeds (e.g., speeds greater than 0 rpm and may be based on compressor load), and (iii) opens the plate, evaporator, and EVI solenoids.

At 556F, the engine module 404 generates the signals COMP2, COND2, EVAP2, and VAL2 to (i) set the speed of the compressor to the second and/or other predetermined speed (e.g., a speed greater than the third speed and/or 56%-100% ON), (ii) runs the evaporator and condenser fans at predetermined speeds (e.g., speeds greater than 0 rpm and may be based on compressor load), (iii) opens the plate, evaporator and EVI solenoids, and (iv) closes the evaporator solenoid. The evaporator solenoid is closed, such that the interior of the box is not being actively cooled, but rather eutectic plates are being cooled. Task 556A may be performed subsequent to performing tasks 556B, 556E, 556F.

During the engine mode, the speeds of the compressor, evaporator and condenser may be set and/or limited based on the state of charge of the battery pack. The percentages ON and/or speeds of the compressor set during tasks 556B, 556E and 556F may be less than the percentages ON and/or speeds of the compressor set during tasks 506B, 506E, 506F of the shore power mode to conserve energy and minimize and/or maintain charge on the batteries of the battery pack.

Although certain example compressor ON percentages and speeds are provided for some of the above-described tasks, other compressor ON percentages and/or speeds may be implemented. The percentages and speeds may be determined based on the compressor load and/or state of charge of the battery pack.

During the engine mode and/or the second pulldown maintenance mode, if one or more doors of the box are opened, the evaporator fan is shut off and the evaporator solenoid is closed. This minimizes the amount of warm air outside the box from entering the box.

Figure 10:
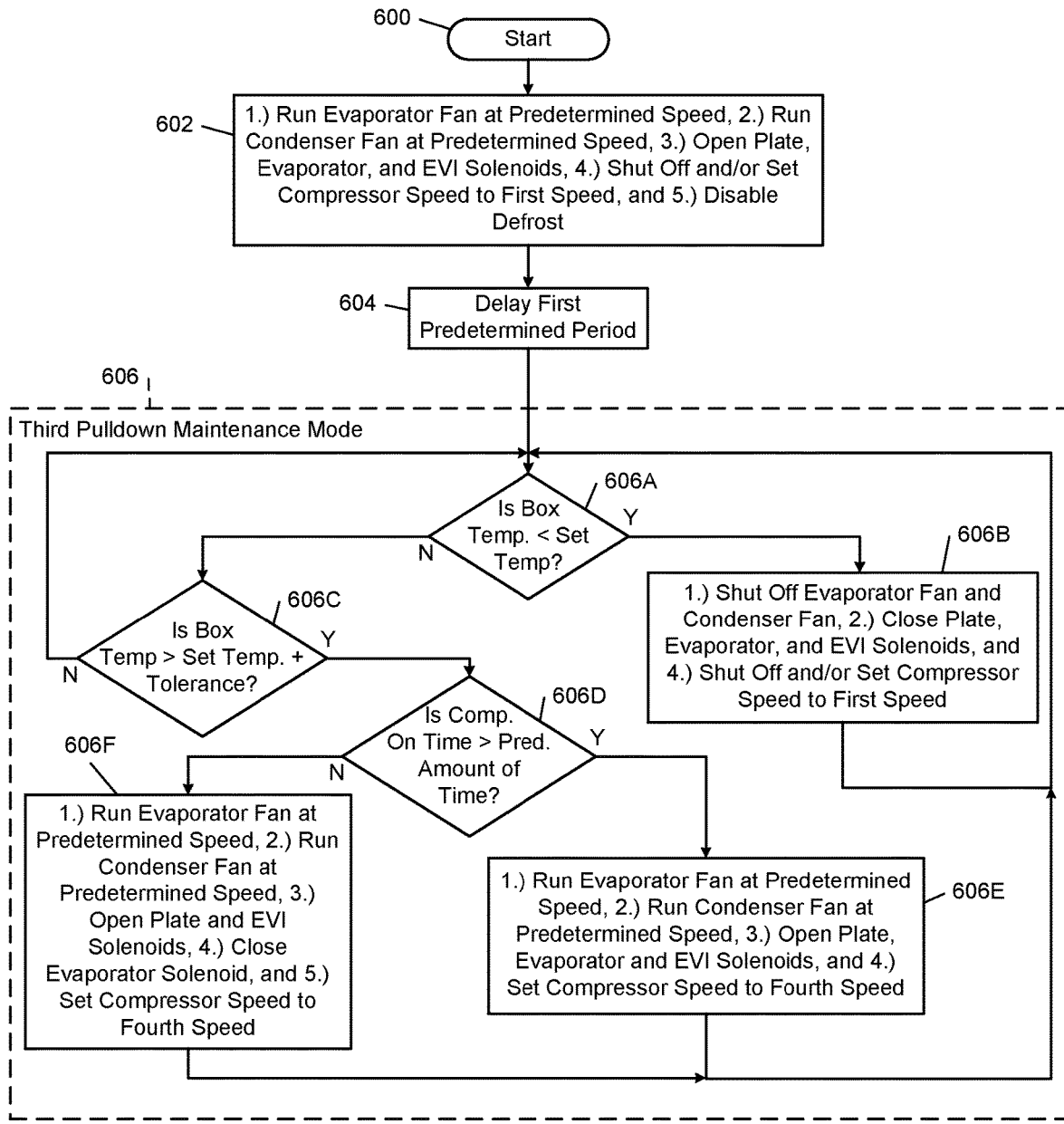
FIG. 10 illustrates a battery method in accordance with an embodiment of the present disclosure.

FIG. 10 shows a battery method. Although the following tasks are primarily described with respect to the implementations of FIGS. 5-6 and 10, the tasks may be easily modified to apply to other implementations of the present disclosure. The tasks may be iteratively performed. Also, although the following tasks are primarily described with respect to use of battery power, the tasks may be modified to include use of solar power from a solar panel and/or solar panel array. The solar power may be drawn from the battery and/or directly from the solar panel and/or solar panel array.

The method may begin at 600. At 602, the battery module 408 performs a start sequence including generating the signals COMP3, COND3, EVAP3, and VAL3 to (i) set the speed of the compressor to a first predetermined speed (e.g., 0% ON (or OFF) and 0 revolutions-per-minute (RPM)), (ii) turn ON an evaporator fan and a condenser fan (e.g., fans 380, 220 of FIG. 5), (iii) if not already open, open plate, evaporator and EVI solenoids (e.g., solenoids 244, 248, 232 of FIG. 5), and (iv) if not already OFF, turn OFF defrost. The speed of the evaporator fan and the condenser fan may be at predetermined speeds or a full ON (100%) speed. The compressor, evaporator fan, and condenser fan may be multi-speed and/or variable speed devices. The signals COMP2, COND2, EVAP2 may be generated based on the signal LOAD.

The compressor module 410, the condenser module 412, the evaporator module 414, and the valve module 416 generate signals COMP, COND, EVAP, $SOL_{PLATE}$, $SOL_{EVAP}$, $SOL_{EVI}$ to control operation, speed, and/or position of the compressor, the condenser fan, the evaporator fan and the plate, evaporator and EVI solenoids based respectively on the signals COMP3, COND3, EVAP3 and VAL3. The signals COMP3, COND3, EVAP3 and VAL3 are also generated based on the operating mode indicated by signal MODE. The speeds of the compressor and evaporator fan may be adjusted based on the load of the compressor while operating in the battery mode.

At 604, the battery module 408 may delay a predetermined period (e.g., 10 seconds) prior to proceeding to task 606. The predetermined period may be greater than or equal to 0 seconds. The battery module 408 waits the predetermined period to assure that none of the cooling fluid lines are blocked.

At 606, the control module 260, while operating in the battery mode, operates in a third pulldown maintenance mode. At 606A, the battery module 408 determines whether the box temperature is less than a predetermined set point temperature (e.g., 33-35° F.). If the box temperature is less than the predetermined set point temperature, then task 606B is performed, otherwise task 606C is performed.

At 606B, the battery module 408 generates the signals COMP3, COND3, EVAP3, and VAL3 to (i) set the speed of the compressor to the first predetermined speed (e.g., 0% or OFF), (ii) shuts off the evaporator fan and the condenser fan, (iii) closes the plate, evaporator and EVI solenoids.

At 606C, the battery module 408 determines whether the box temperature is greater than a sum of the predetermined set point temperature and a tolerance value (e.g., 0-3° F.). If the box temperature is greater than the sum, the box temperature is out of a predetermined range of the predetermined set point temperature and task 606D is performed, otherwise the box temperature is referred to as being "in range" and task 606A is performed. The tolerance prevents short cycling the compressor by assuring the compressor is maintained in an ON state for a minimum run time.

At 606D, the battery module 408 determines whether the compressor has been ON (operating at a speed greater than a predetermined speed) for a predetermined amount of time (e.g., 3 minutes). If the compressor has been ON for more than the predetermined amount of time, task 606E is performed, otherwise task 606F is performed. As an example, when the compressor has been operating at greater than or equal to 34% for at least 3 minutes, then task 606E is performed.

At 606E, the battery module 408 generates the signals COMP3, COND3, EVAP3, and VAL3 to (i) set the speed of the compressor to the third and/or other predetermined speed (e.g., a speed greater than the third speed and/or 34%-100% ON), (ii) runs the evaporator and condenser fans at predetermined speeds (e.g., speeds greater than 0 rpm and may be based on compressor load), and (iii) opens the plate, evaporator and EVI solenoids. In one embodiment, the third speed is 34%.

During the battery mode, the speeds of the compressor, evaporator and condenser may be set and/or limited based on the state of charge of the battery pack. As the state of charge of the battery pack decreases speeds of the compressor, evaporator and/or condenser may be decreased. In one embodiment, when the state of charge of the battery pack drop below a first predetermined threshold, the compressor is shut off. In another embodiment, when the state of charge of the battery pack drop below a second predetermined threshold, the evaporator fan is shut off. The second threshold is less than the first threshold. In another embodiment, when the state of charge of the battery pack drops below a third predetermined threshold, the condenser fan is shut off. The third threshold is less than or equal to the second threshold.

At 606F, the battery module 408 generates the signals COMP3, COND3, EVAP3, and VAL3 to (i) set the speed of the compressor to the second and/or other predetermined speed (e.g., a speed greater than the third speed and/or 34%-100% ON), (ii) runs the evaporator and condenser fans at predetermined speeds (e.g., speeds greater than 0 rpm and may be based on compressor load), (iii) opens the plate, evaporator and EVI solenoids, and (iv) closes the evaporator solenoid. The evaporator solenoid is closed, such that the interior of the box is not being actively cooled, but rather eutectic plates are being cooled. Task 606A may be performed subsequent to performing tasks 606B, 606E, 606F. The compressor, evaporator fan and condenser fan may be shut off based on the state of charge of the battery pack, as described above.

The percentages ON and/or speeds of the compressor set during tasks 606B, 606E and 606F may be less than the percentages ON and/or speeds of the compressor set during tasks 556B, 556E, 556F of the engine mode to conserve energy and minimize and/or maintain charge on the batteries of the battery pack. The percentages and speeds during the engine mode and/or the battery mode may be (i) set to at least predetermined minimum percentages and speeds to maintain set point temperatures, and/or (ii) limited based on the compressor load and the state of charge of the battery pack. This conserves energy while operating in the engine mode and/or battery mode.

Although certain example compressor ON percentages and speeds are provided for some of the above-described tasks, other compressor ON percentages and/or speeds may be implemented. The percentages and speeds may be determined based on the compressor load and/or state of charge of the battery pack.

During the battery mode and/or the third pulldown maintenance mode, if one or more doors of the box are opened, the evaporator fan is shut off and the evaporator solenoid is closed. This minimizes the amount of warm air outside the box from entering the box.

Figure 11:
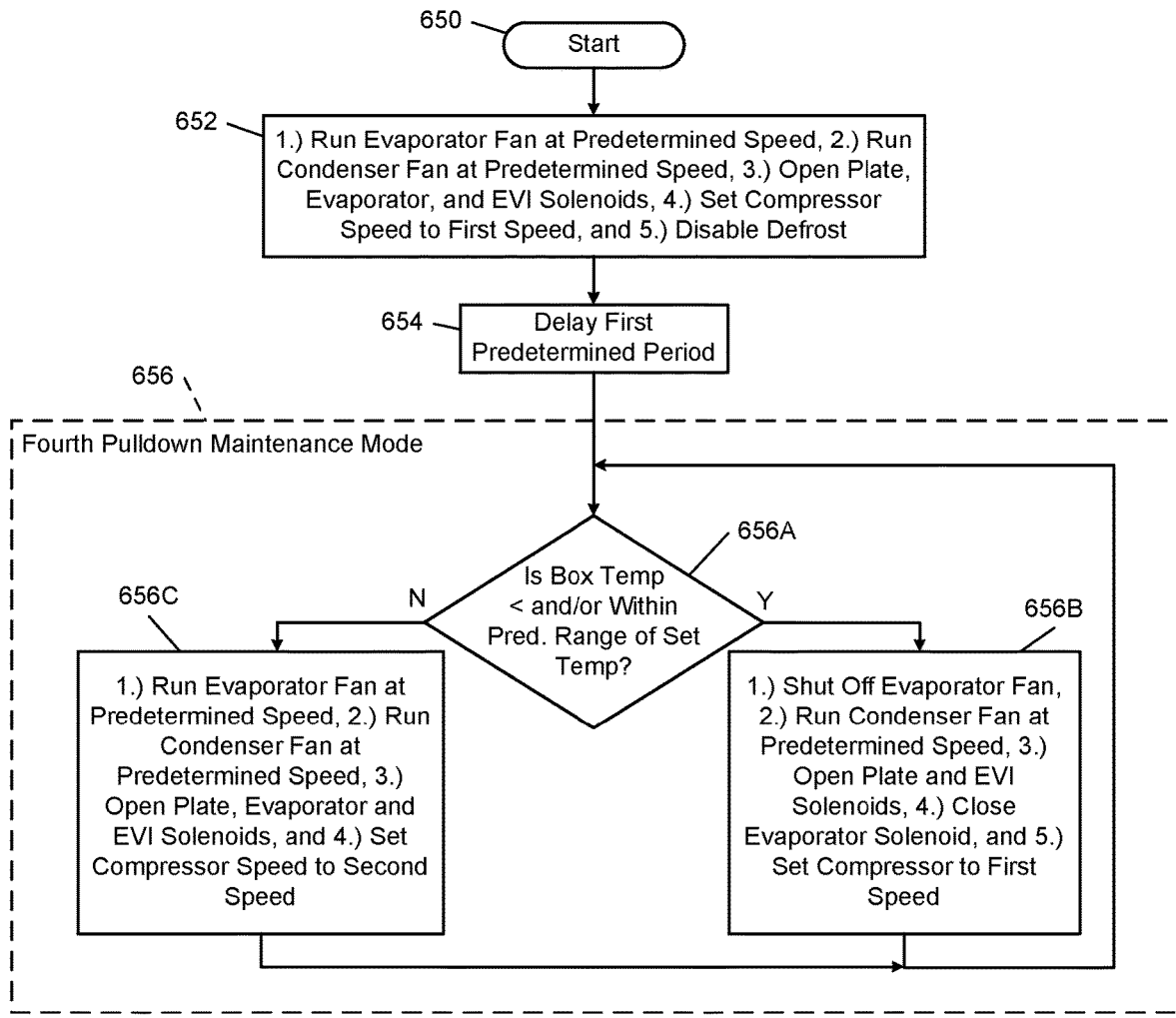
FIG. 11 illustrates another engine method in accordance with an embodiment of the present disclosure.

FIG. 11 shows another engine method. Although the following tasks are primarily described with respect to the implementations of FIGS. 5-6 and 11, the tasks may be easily modified to apply to other implementations of the present disclosure. The tasks may be iteratively performed.

The method may begin at 650. At 652, the engine module 406 performs a start sequence including generating the signals COMP2, COND2, EVAP2, and VAL2 to (i) set the speed of the compressor to a first predetermined speed (e.g., 0% ON (or OFF) and 0 revolutions-per-minute (RPM)), (ii) turn ON an evaporator fan and a condenser fan (e.g., fans 380, 220 of FIG. 5), (iii) if not already open, open plate, evaporator and EVI solenoids (e.g., solenoids 244, 248, 232 of FIG. 5), and (iv) if not already OFF, turn OFF defrost. The speed of the evaporator fan and the condenser fan may be at predetermined speeds or a full ON (100%) speed. The compressor, evaporator fan, and condenser fan may be multi-speed and/or variable speed devices. The signals COMP2, COND2, EVAP2 may be generated based on the signal LOAD.

The compressor module 410, the condenser module 412, the evaporator module 414, and the valve module 416 generate signals COMP, COND, EVAP, $SOL_{PLATE}$, $SOL_{EVAP}$, $SOL_{EVI}$ to control operation, speed, and/or position of the compressor, the condenser fan, the evaporator fan and the plate, evaporator and EVI solenoids based respectively on the signals COMP2, COND2, EVAP2 and VAL2. The signals COMP2, COND2, EVAP2 and VAL2 are also generated based on the operating mode indicated by signal MODE. The speeds of the compressor and evaporator fan may be adjusted based on the load of the compressor while operating in the engine mode.

At 654, the engine module 406 may delay a predetermined period (e.g., 10 seconds) prior to proceeding to task 556. The predetermined period may be greater than or equal to 0 seconds. The engine module 406 waits the predetermined period to assure that none of the cooling fluid lines are blocked.

At 656, the control module 260, while operating in the engine mode, operates in a fourth pulldown maintenance mode. At 656A, the engine module 404 determines whether the box temperature is less than and/or within a predetermined range of a predetermined set point temperature (e.g., 33-35° F.). If the box temperature is less than and/or within the predetermined range of the predetermined set point temperature, then task 656B is performed, otherwise task 656C is performed.

At 656B, the engine module 404 generates the signals COMP2, COND2, EVAP2, and VAL2 to (i) set the speed of the compressor to a predetermined speed (e.g., 34-100% ON), (ii) shuts OFF the evaporator fan, (iii) runs the condenser fan at a predetermined speed (e.g., speeds greater than 0 rpm and may be based on compressor load), (iv)

opens the plate and EVI solenoids, and (v) closes the evaporator solenoid. The evaporator solenoid is closed, such that the interior of the box is not being actively cooled, but rather eutectic plates are being cooled. This quickly charges the eutectic plates.

At 656C, the engine module 404 generates the signals COMP2, COND2, EVAP2, and VAL2 to (i) set the speed of the compressor to another predetermined speed (e.g., 34-100% ON), (ii) runs the evaporator and condenser fans at predetermined speeds (e.g., speeds greater than 0 rpm and may be based on compressor load), and (iii) opens the plate, evaporator and EVI solenoids. At 656C, the plate and evaporator solenoids are open, to allow quick charging (cooling) of the eutectic plates and recovery (or cool down) of the box to the set point temperature after, for example, a delivery. By running the evaporator, dehumidification of air in the box is performed. Dehumidification may be performed based on whether one or more of the doors are open, timing of when one or more of the doors are opened, and/or how long one or more of the doors are open. The evaporator is run and the evaporator and plate solenoids are open, since the battery pack is at a state of charge during the engine mode that is higher than the state of charge during the battery mode. This is unlike the battery mode of FIG. 12, where the plate solenoid is closed to quickly cool down the box temperature and conserve power.

Subsequent to performing tasks 656B and 656C, task 656A may be performed.

Although certain example compressor ON percentages and speeds are provided for some of the above-described tasks, other compressor ON percentages and/or speeds may be implemented. The percentages and speeds may be determined based on the compressor load and/or state of charge of the battery pack.

During the engine mode and/or the fourth pulldown maintenance mode, if one or more doors of the box are opened, the evaporator fan is shut off and the evaporator solenoid is closed. This minimizes the amount of warm air outside the box from entering the box.

Figure 12:
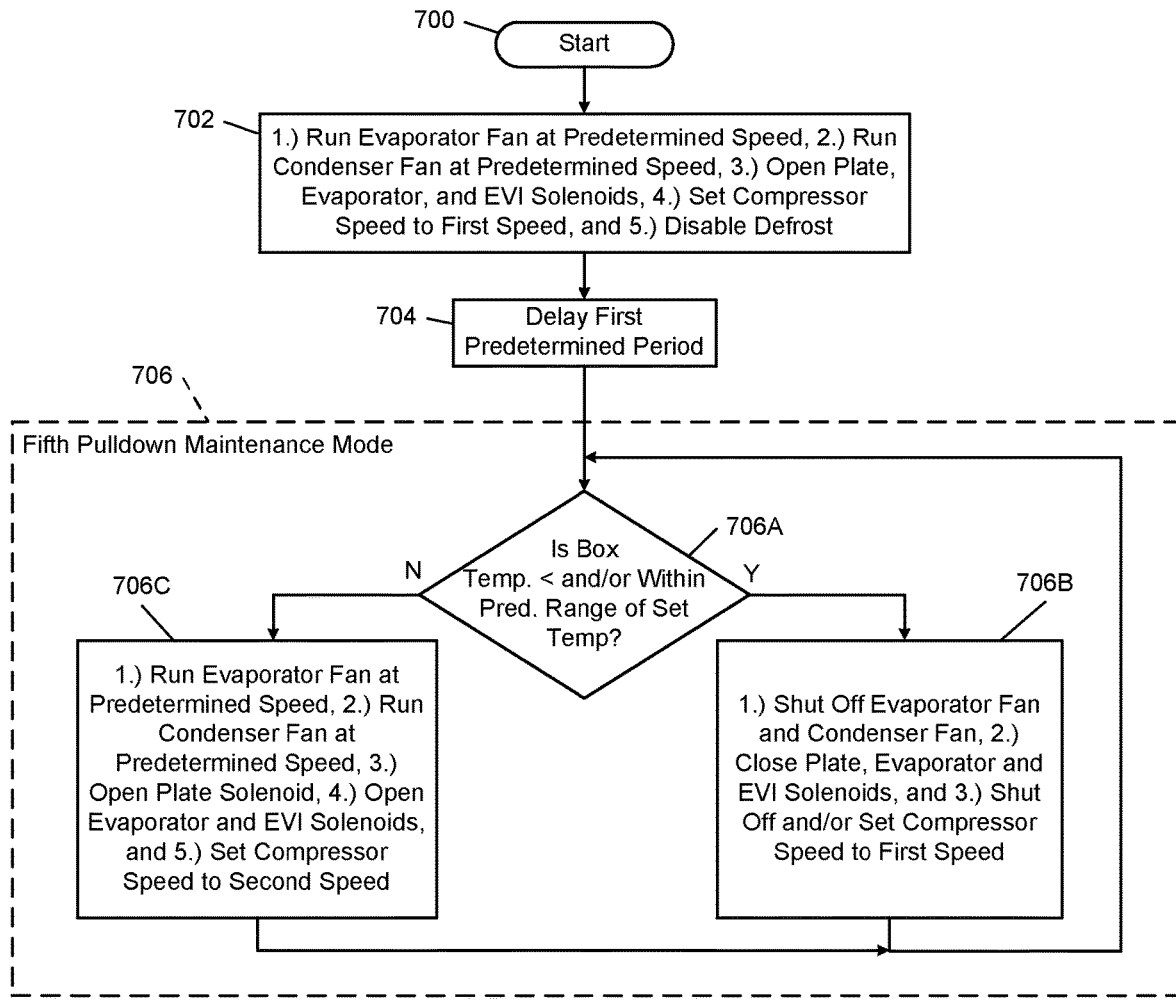
FIG. 12 illustrates another battery method in accordance with an embodiment of the present disclosure.

The method of FIG. 12 allows for quick cool down of the box after a door of the box is opened by running the evaporator while the corresponding truck is in route. The eutectic plates are charged while in route, which reduces pull down time at night when the truck is no longer in route. The method of FIG. 12 also prevents and/or minimizes frost buildup on evaporator coils and/or the eutectic plates by running the evaporator to dehumidify the air in the box.

FIG. 12 shows another battery method. Although the following tasks are primarily described with respect to the implementations of FIGS. 5-6 and 12, the tasks may be easily modified to apply to other implementations of the present disclosure. The tasks may be iteratively performed. Also, although the following tasks are primarily described with respect to use of battery power, the tasks may be modified to include use of solar power from a solar panel and/or solar panel array. The solar power may be drawn from the battery and/or directly from the solar panel and/or solar panel array.

The method may begin at 700. At 702, the battery module 408 performs a start sequence including generating the signals COMP3, COND3, EVAP3, and VAL3 to (i) set the speed of the compressor to a first predetermined speed (e.g., 0% ON (or OFF) and 0 revolutions-per-minute (RPM)), (ii) turn ON an evaporator fan and a condenser fan (e.g., fans 380, 220 of FIG. 5), (iii) if not already open, open plate, evaporator and EVI solenoids (e.g., solenoids 244, 248, 232 of FIG. 5), and (iv) if not already OFF, turn OFF defrost. The speed of the evaporator fan and the condenser fan may be at predetermined speeds or a full ON (100%) speed. The compressor, evaporator fan, and condenser fan may be multi-speed and/or variable speed devices. The signals COMP2, COND2, EVAP2 may be generated based on the signal LOAD.

The compressor module 410, the condenser module 412, the evaporator module 414, and the valve module 416 generate signals COMP, COND, EVAP, $SOL_{PLATE}$, $SOL_{EVAP}$, $SOL_{EVI}$ to control operation, speed, and/or position of the compressor, the condenser fan, the evaporator fan and the plate, evaporator and EVI solenoids based respectively on the signals COMP3, COND3, EVAP3 and VAL3. The signals COMP3, COND3, EVAP3 and VAL3 are also generated based on the operating mode indicated by signal MODE. The speeds of the compressor and evaporator fan may be adjusted based on the load of the compressor while operating in the battery mode.

At 704, the battery module 408 may delay a predetermined period (e.g., 10 seconds) prior to proceeding to task 706. The predetermined period may be greater than or equal to 0 seconds. The battery module 408 waits the predetermined period to assure that none of the cooling fluid lines are blocked.

At 706, the control module 260, while operating in the battery mode, operates in a fifth pulldown maintenance mode. At 706A, the battery module 404 determines whether the box temperature is less than and/or within a predetermined range of a predetermined set point temperature (e.g., 33-35° F.). If the box temperature is less than and/or within the predetermined range of the predetermined set point temperature, then task 656B is performed, otherwise task 656C is performed.

At 706B, the battery module 408 generates the signals COMP3, COND3, EVAP3, and VAL3 to (i) shuts OFF the compressor, (ii) shuts off the evaporator fan and the condenser fan, (iii) closes the plate, evaporator and EVI solenoids.

At 706C, the battery module 408 generates the signals COMP3, COND3, EVAP3, and VAL3 to (i) set the speed of the compressor to a predetermined speed (e.g., 34%-100% ON), (ii) runs the evaporator and condenser fans at predetermined speeds (e.g., speeds greater than 0 rpm and may be based on compressor load), (iii) opens the evaporator and EVI solenoids, and (iv) opens the plate solenoid if not already opened. This dehumidifies air in the box of the truck and allows the box to be quickly cooled to recover the box temperature after a truck delivery. Refrigerant is sent to the evaporator and not to the eutectic plates. This decreases compressor and evaporator ON time to conserve charge on the batteries. This also reduces frost buildup on evaporator coils and/or the eutectic plates. The speeds of the compressor, evaporator fan and condenser fan may be set based on the state of charge of the battery pack. The compressor, evaporator fan and condenser fan may be shut off based on the state of charge of the battery pack, as described above.

Anytime the compressor is running the plate solenoid is open to allow the plate to receive a supplemental charge even though the primary cooling means is conducted by the evaporator. This is to allow the body to draw off the plates if the compressor is in its minimum time off cycle for the fan cycling operation to continue to cool the body or (built in as a safety measure to protect the load) if the batteries are depleted and can no longer run the compressor.

The percentages ON and/or speeds of the compressor set during tasks 706B, 706C may be less than the percentages ON and/or speeds of the compressor set during one of the above-described engine modes to conserve energy and minimize and/or maintain charge on the batteries of the battery pack. The percentages and speeds may be set and/or limited based on the compressor load and the state of charge of the battery pack. This conserves energy while operating in the battery mode.

Although certain example compressor ON percentages and speeds are provided for some of the above-described tasks, other compressor ON percentages and/or speeds may be implemented. The percentages and speeds may be determined based on the compressor load and/or state of charge of the battery pack.

During the battery mode and/or the fifth pulldown maintenance mode, if one or more doors of the box are opened, the evaporator fan is shut off and the evaporator solenoid is closed. This minimizes the amount of warm air outside the box from entering the box.

The above-described tasks of FIGS. 7-12 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 13:
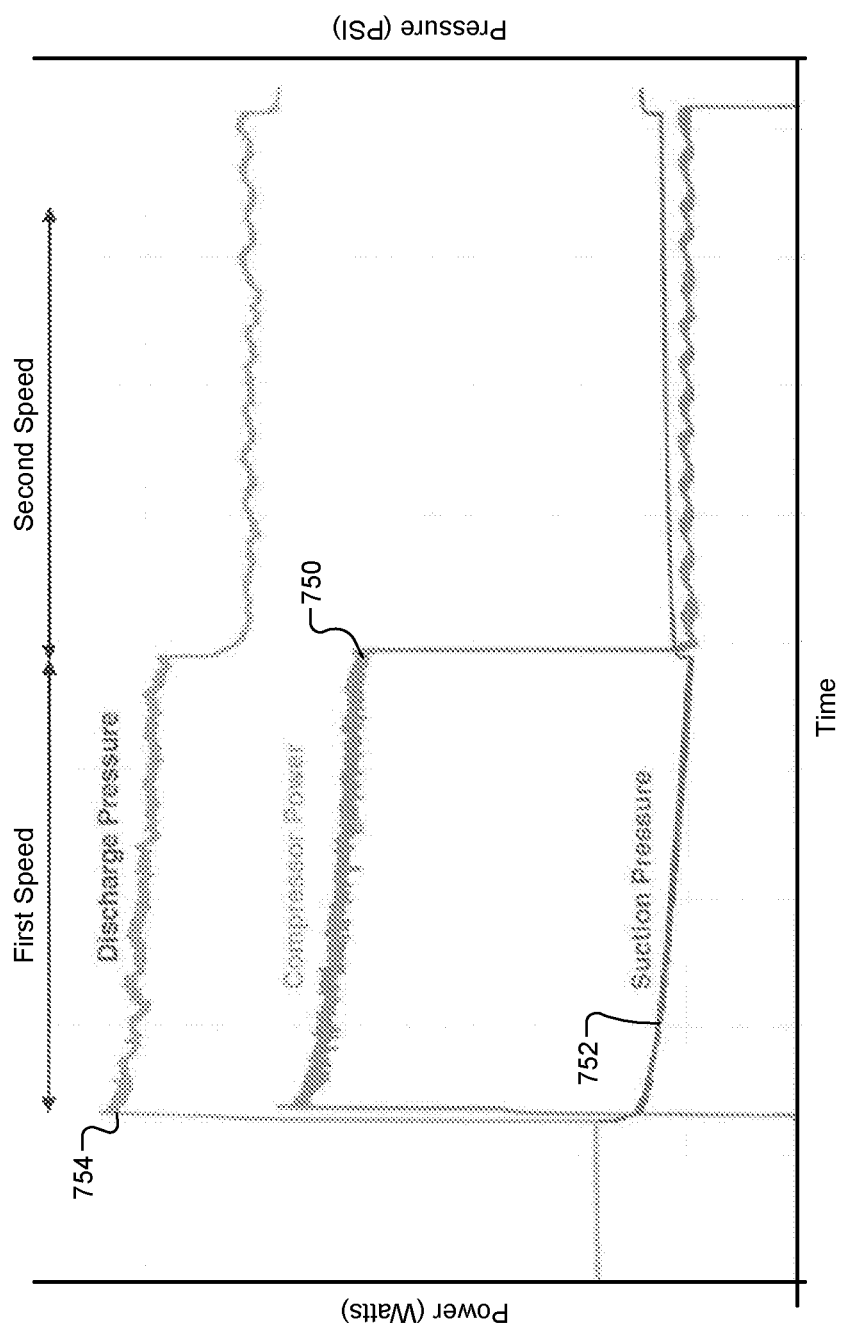
FIG. 13 is a plot of compressor power, suction pressure, and discharge pressure versus time illustrating reduced power draw during a battery mode in accordance with an embodiment of the present disclosure.

FIG. 13 shows an example plot of compressor power, suction pressure, and discharge pressure versus time illustrating reduced power draw during one of the battery modes. A compressor power curve 750, a suction pressure curve 752, and a discharge pressure curve 754 illustrate reducing speed of the compressor from a first speed (e.g., 5400 RPM) to a second speed (e.g., 1200 RPM). Box Temperature is maintained within a predetermined range (e.g., a 3° F. range while the speed of the compressor is reduced. By reducing the capacity and power of the compressor results in forcing less mass flow through heat exchangers and a more favorable operating condition.

By running a variable speed compressor that operates based on current received from a battery pack, as opposed to running off of an engine, reliability of the above-described systems is improved. This is because there is no shaft seal as with an open drive compressor that runs off of an engine. There is typically oil leakage and high maintenance costs associated with having a shaft seal.

Figure 14:
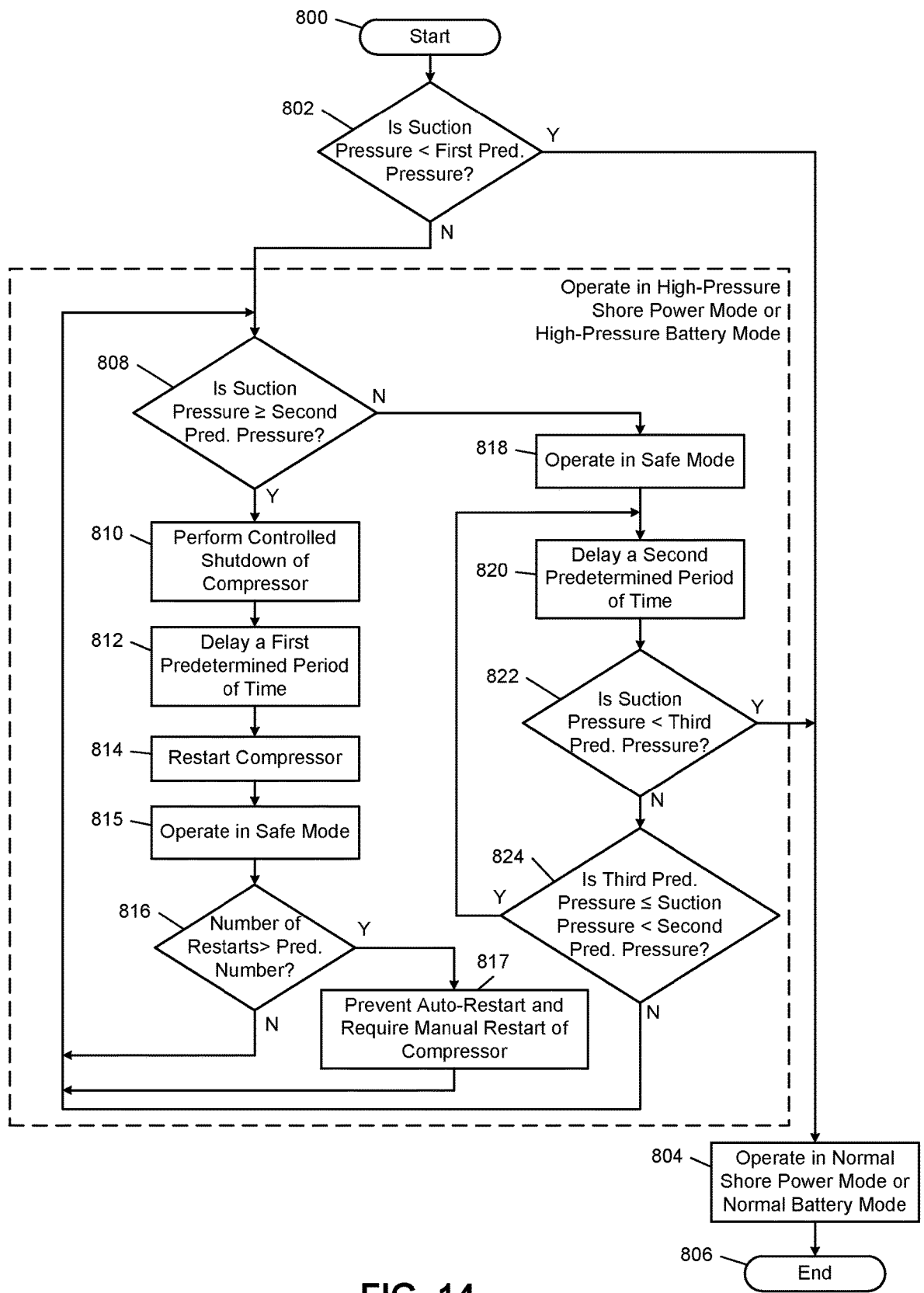
FIG. 14 illustrates a high-pressure method for operation in a shore power mode or a battery power mode in accordance with an embodiment of the present disclosure.

FIG. 14 shows a high-pressure method for operation in a shore power mode or a battery power mode. Although the following tasks are primarily described with respect to the implementations of FIGS. 5-6 and 14, the tasks may be easily modified to apply to other implementations of the present disclosure. The tasks may be iteratively performed.

The method may begin at 800. At 802, the shore power module 404 and/or the battery module 408 determines whether the suction pressure is less than a first predetermine pressure (e.g., 425 psig). If the suction pressure is less than the first predetermined pressure, then task 804 may be performed, otherwise operation 808 is performed.

At 804, the shore power module 404 operates in a normal shore power mode as described above with respect to the method of FIG. 8 or the battery module 408 operates in a normal battery power mode as described above with respect to the methods of FIGS. 10 and 12. The method may end at 806.

At 808, the shore power module 404 and/or the battery module 408 determines whether the suction pressure is greater than or equal to a second predetermined pressure (e.g., 435 psig). The second predetermined pressure may be greater than the first predetermined pressure. If the suction pressure is greater than or equal to the second predetermined pressure, then task 810 is performed, otherwise task 818 is performed.

At 810, the compressor module 410 performs a controlled shutdown of the compressor. The shore power module 404 and/or the battery module 408 may generate the signals COMP1 or COMP3 to instruct the compressor module 410 to perform a controlled shutdown. The controlled shutdown may include, for example, ramping down the speed of the compressor, stopping he compressor over a predetermined period of time, and/or performing other predetermined controlled shutdown tasks.

At 812, the shore power module 404 and/or the battery module 408 delay a first predetermined period (e.g., 2 minutes). At 814, the compressor module 410 restarts the compressor. The shore power module 404 and/or the battery module 408 may generate the signals COMP1 or COMP3 to instruct the compressor module 410 to restart the compressor.

At 815, the compressor module 410 operates in a "safe" mode, which includes operating the compressor at a reduced predetermined speed (e.g., 2700 RPM) and/or reduced predetermined percentage (e.g., 50%) of a full operating range of the compressor. Task 808 may be performed subsequent to task 816.

At 816, the shore power module 404, the battery module 408 and/or the compressor module 410 determines whether the number of times the compressor has been restarted is greater than a predetermined number of restarts (e.g., 3 restarts). The number of times the compressor has been restarted may be evaluated over a last predetermined period of time or the number of restarts may be reset to zero when (i) a manual restart is performed, (ii) the suction pressure drops below the first or third predetermined pressures, and/or (iii) another criterion is satisfied. The predetermined number of restarts may be set by a user.

At 817, the shore power module 404, the battery module 408 and/or the compressor module 410 prevents an auto-restart as performed at 814 and requires a manual restart of the compressor. Task 808 may be performed subsequent to a manual restart of the compressor. A manual restart of the compressor may include a user providing a user input and the shore power module 404, the battery module 408 and/or the compressor module 410 restarting the compressor.

At 818, the compressor module 410 operates in the "safe" mode, which includes operating the compressor at the reduced predetermined speed (e.g.,2700 RPM) and/or the reduced predetermined percentage (e.g., 50%) of the full operating range of the compressor. At 820, the shore power module 404 and/or the battery module 408 delay a second predetermined period (e.g., 15 minutes).

At 822, the shore power module 404 and/or the battery module 408 determines whether the suction pressure is less than a third predetermined pressure (e.g., 400 psig). The third predetermined pressure may be less than the first and second predetermined pressures. If the suction pressure is less than the third predetermined pressure, then task 804 may be performed, otherwise task 824 is performed.

At 824, the shore power module 404 and/or the battery module 408 determines whether the suction pressure is greater than or equal to the third predetermined pressure or less than the second predetermined pressure. If the suction pressure is within this range, task 820 is performed, otherwise task 808 is performed.

The above-described tasks of FIGS. 7-12 and 14 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described control methods of FIGS. 7-12 and 14 accurately control box temperature and minimize power draw from batteries. The control methods ensure a system is properly powered prior to starting and performs low-speed and moderate compressor speed startups. The low-speed compressor startup (e.g., see above task 512 of FIG. 8) prevents oil pump out during high-loading in a flooded start condition. The moderate speed compressor startup (e.g., see tasks 508-510 of FIG. 8) ensures adequate drive temperatures in a hot soak condition.

Although the above-described methods are primarily described with respect to a system that includes both eutectic plates and an evaporator, the methods may be modified to apply to systems that do not include eutectic plates or an evaporator. The methods may be applied to a single evaporator system, a eutectic plate system, a multi-evaporator system or system including both eutectic plates and an evaporator, and a system using electronic expansion valves.

The above-described battery modes allow a system to, upon detecting disconnection of shore power and shutting OFF an engine (alternator/generator is OFF), run a compressor at a minimal or reduced speed to conserve power. This may be accomplished via a single command and include requesting a low-operating speed, a reduction in a maximum permitted compressor speed, and/or active control of compressor speed based on battery charge. During the battery modes, the speeds of the compressor, evaporator fan and/or condenser fan may be limited to respective levels based on the state of charge of the battery pack and may be reduced when the state of charge of the battery pack decreases. The condenser fan speed may be adjusted by modulating current supplied to the condenser fan via the condenser module 412 of FIG. 6A based on the load, the speed of the compressor, and/or the discharge pressure of the compressor. The evaporator fan and the condenser fan may be placed in a low-power state (e.g., power supplied to the evaporator fan and/or the condenser fan are less than a predetermined power level) when the compressor is placed in a low-power state. This operation can be continued until shore power is reconnected or the engine is ON and power is being generated via the electrical source (e.g., alternator and/or generator).

To further reduce power draw while operating in the battery modes, vapor injection may be turned OFF. This may be accomplished by closing the EVI solenoid 232 of FIG. 3. The vapor injection may be turned OFF by the control module 260 while in a low-power state and/or while reducing compressor speed. The vapor injection may be OFF when the compressor is ON and running at a speed greater than 0 RPM.

The battery modes provide increased compressor, evaporator fan, and condenser fan run times and increased periods of time when the box temperature is maintained at a predetermined set point temperature. These modes also allow for the electrical source (e.g., 48V alternator/generator) used for charging the battery pack associated with the refrigeration system to be removed from the vehicle. In one embodiment, the vehicle 100 of FIG. 1 does not include an alternator/generator for charging the battery pack of the refrigeration system. The vehicle 100 may however include an electrical source (e.g., 12V alternator/generator) for charging a battery for other non-refrigeration related tasks (e.g., cab lighting and cab electronics, such as a navigation system, a stereo system, etc.) A 12V vehicle battery system may also be used to run evaporator fans as a safety measure to allow fan cycling and for cooling to occur by drawing off the eutectic plate(s) if the batteries are depleted and the controller prevents the compressor from running. This is especially applicable to 48V systems for which alternator/generators are expensive and/or not available. In this example, the system operates in either the disclosed shore power mode or one or more of the disclosed battery modes and does not operate in one of the disclosed engine modes. The battery modes allow for box temperature maintenance over increased periods of time, such that charging may only need to be performed while shore power is connected, as opposed to while a truck is in route.

At night, when shore power is connected, the compressor, the evaporator fan, and/or the condenser fan speeds may be reduced to reduce an amount of noise generated. The speeds may be reduced based on compressor load. As described above, when the vehicle 100 is in route, compressor load may be low and thus evaporator fan and condenser fan speeds may be reduced to reduce the amount of noise generated when the vehicle 100 is stopped and is in, for example, a residential area. The fan speeds may also be reduced based on a speed of the vehicle 100 and/or whether the engine of the vehicle 100 is ON. For example, when the engine is ON and the vehicle speed is 0, the speeds of the fans may be reduced. If the engine is ON and the vehicle speed is 0, this can indicate that the vehicle 100 is in route, as opposed to be shut off and at a charging station. The control module 260 may control the speeds based on a vehicle speed signal from a vehicle speed sensor 800 (shown in FIG. 5) and/or based on the ignition signal from the ignition sensor 304, which may indicate whether the engine is ON or OFF.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "control module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
    a mode module configured to determine whether to operate in a shore power mode, an engine mode, or a battery mode based on a plurality of parameters;
    a shore power module configured to, while operating in the shore power mode, set a compressor at a speed based on a temperature within a temperature-controlled container of a vehicle and limit the speed of the compressor to a first speed, wherein a first battery is charged based on power received from at least one of a utility power source and a solar power source while in the shore power mode;
    an engine module configured to, while operating in the engine mode, set the speed of the compressor based on the temperature and limit the speed of the compressor to a second speed, wherein the first battery, while in the engine mode, is charged based on power received from at least one of an electrical source driven by an engine of the vehicle or the solar power source, wherein the second speed is less than or equal to the first speed, and wherein the electrical source is an alternator or a generator;

a battery module configured to, while operating in the battery mode, set the speed of the compressor based on the temperature and limit the speed of the compressor to a third speed, wherein, while in the battery mode, the first battery is not being charged based on power from (a) a shore power source, and (b) the electrical source from which power is received during the engine mode, and wherein the third speed is greater than 0 and less than the first speed and the second speed; and a control module configured to (i) determine whether the system is operating in the shore power mode, the engine mode, or the battery mode, (ii) based on which one of the shore power mode, the engine mode, or the battery mode the system is operating in, perform at least one operation to determine whether to permit passage of a refrigerant through an evaporator and to determine whether to permit passage of the refrigerant through eutectic plates, and (iii) based on a result of the at least one operation, control passage of the refrigerant through at least one of the evaporator or the eutectic plates.

2. The system of claim 1, wherein the plurality of parameters comprise (i) a first parameter indicating whether shore power is connected, (ii) a second parameter indicating whether the alternator or the generator is ON and charging the first battery, and (iii) a suction pressure of the compressor.

3. The system of claim 1, wherein:
the plurality of parameters comprise a state of charge of one or more batteries; and
the one or more batteries include the first battery.

4. The system of claim 1, wherein the shore power module is configured to, while operating in the shore power mode:
if the temperature is less than a set point temperature, prevent the refrigerant from passing through eutectic plates and the evaporator; and
if the temperature is greater than the set point temperature, permit the refrigerant to pass through the eutectic plates or the evaporator.

5. The system of claim 4, wherein the shore power module is configured to, while operating in the shore power mode:
if the temperature is greater than the set point temperature for more than a predetermined period, permit passage of the refrigerant through the eutectic plates and the evaporator; and
if the temperature is greater than the set point temperature for less than the predetermined period, (i) permit passage of the refrigerant through the eutectic plates, and (ii) prevent passage of the refrigerant through the evaporator.

6. The system of claim 1, wherein the shore power module is configured to, while operating in the shore power mode and if the plurality of parameters satisfy a plurality of conditions, (i) run an evaporator fan, (ii) run a condenser fan, and (iii) permit passage of the refrigerant through eutectic plates and the evaporator.

7. The system of claim 1, wherein the shore power module is configured to (i) if the plurality of parameters satisfy a plurality of conditions, set the speed of the compressor to 0 for a first predetermined period, and (ii) subsequent to the first predetermined period, set the speed of the compressor to a speed greater than 0 for a second predetermined period.

8. The system of claim 7, wherein the shore power module is configured to (i) if an ambient temperature is greater than a predetermined temperature, set the speed of the compressor to a speed less than or equal to the first speed, and (ii) if the ambient temperature is less than the predetermined temperature, set the speed of the compressor to the third speed or a speed less than the first speed.

9. The system of claim 8, wherein:
the shore power module is configured to (i) if the ambient temperature is less than the predetermined temperature, set the speed of the compressor to a speed less than or equal to the third speed for a third predetermined period, and (ii) subsequent to the third predetermined period, set the speed of the compressor to a speed less than or equal to the first speed; and
the third predetermined period is less than the second predetermined period.

10. A system comprising:
a mode module configured to determine whether to operate in a shore power mode, an engine mode, or a battery mode based on a plurality of parameters;
a shore power module configured to, while operating in the shore power mode, set a compressor at a speed based on a temperature within a temperature-controlled container of a vehicle and limit the speed of the compressor to a first speed, wherein a first battery is charged based on power received from at least one of a utility power source and a solar power source while in the shore power mode;
an engine module configured to, while operating in the engine mode, set the speed of the compressor based on the temperature and limit the speed of the compressor to a second speed, wherein the first battery, while in the engine mode, is charged based on power received from at least one of an electrical source driven by an engine of the vehicle or the solar power source, wherein the second speed is less than or equal to the first speed, and wherein the electrical source is an alternator or a generator; and
a battery module configured to, while operating in the battery mode, set the speed of the compressor based on the temperature and limit the speed of the compressor to a third speed, wherein, while in the battery mode, the first battery is not being charged based on power from (a) a shore power source, and (b) the electrical source from which power is received during the engine mode, and wherein the third speed is greater than 0 and less than the first speed and the second speed,
wherein
the shore power module is configured to, while in the shore power mode and based on a suction pressure of the compressor, operate in a pulldown maintenance mode to pulldown a temperature of eutectic plates; and
the pulldown maintenance mode comprises, based on the temperature of the temperature-controlled container, switching between (i) preventing passage of a refrigerant to the eutectic plates and an evaporator, (ii) permitting passage of the refrigerant through the eutectic plates and preventing passage of the refrigerant through the evaporator, and (iii) permitting passage of the refrigerant through the eutectic plates and the evaporator.

11. The system of claim 1, wherein the engine module is configured to, while operating in the engine mode:
if the temperature is less than a set point temperature, prevent the refrigerant from passing through eutectic plates and the evaporator; and
if the temperature is greater than the set point temperature, permit the refrigerant to pass through the eutectic plates or the evaporator.

12. The system of claim 11, wherein the engine module is configured to, while operating in the engine mode:
   if the temperature is greater than the set point temperature for more than a predetermined period, permit passage of the refrigerant through the eutectic plates and the evaporator; and
   if the temperature is greater than the set point temperature for less than the predetermined period, (i) permit passage of the refrigerant through the eutectic plates, and (ii) prevent passage of the refrigerant through the evaporator.

13. The system of claim 1, wherein the battery module is configured to, while operating in the battery mode:
   if the temperature is less than a set point temperature, prevent the refrigerant from passing through eutectic plates and the evaporator; and
   if the temperature is greater than the set point temperature, permit the refrigerant to pass through the eutectic plates or the evaporator.

14. The system of claim 13, wherein the battery module is configured to, while operating in the battery mode:
   if the temperature is greater than the set point temperature for more than a predetermined period, permit passage of the refrigerant through the eutectic plates and the evaporator; and
   if the temperature is greater than the set point temperature for less than the predetermined period, (i) permit passage of the refrigerant through the eutectic plates, and (ii) prevent passage of the refrigerant through the evaporator.

15. The system of claim 1, wherein the control module configured to, while in at least one of the shore power mode, the engine mode, or the battery mode:
   shut off an evaporator fan if a door of the temperature-controlled container is in an open state; and
   run the evaporator fan based on the temperature when the door is in a closed state.

16. The system of claim 1, wherein at least one of:
   the shore power module is configured to determine the first speed based on a load on the compressor;
   the engine module is configured to determine the second speed based on the load on the compressor; and
   the battery module is configured to determine the third speed based on the load on the compressor.

17. The system of claim 1, further comprising:
   the compressor;
   eutectic plates;
   the evaporator;
   an evaporator fan;
   a condenser fan; and
   a plurality of valves,
   wherein the control module configured to, based on whether the system is operating in the shore power mode, the engine mode or the battery mode, control operation of the evaporator fan and the condenser fan and states of the plurality of valves, wherein controlling states of the plurality of valves controls flow of the refrigerant through the eutectic plates and the evaporator.

18. The system of claim 1, wherein:
   wherein the first battery is charged based on power received from the utility power source while in the shore power mode; and
   the first battery, while in the engine mode, is charged based on power received from the electrical source driven by the engine of the vehicle.

19. A method comprising:
   determining whether to operate in a shore power mode, an engine mode or a battery mode based on a plurality of parameters;
   while operating in the shore power mode, setting a compressor at a speed based on a temperature within a temperature-controlled container of a vehicle and limiting the speed of the compressor to a first speed, wherein a first battery is charged based on power received from at least one of a utility power source and a solar power source while in the shore power mode;
   while operating in the engine mode, setting the speed of the compressor based on the temperature and limiting the speed of the compressor to a second speed, wherein the first battery, while in the engine mode, is charged based on power received from at least one of an alternator, a generator or the solar power source, and wherein the second speed is equal to or less than the first speed;
   while operating in the battery mode, setting the speed of the compressor based on the temperature and limiting the speed of the compressor to a third speed, wherein, while in the battery mode, the first battery is not being charged based on power from (i) a shore power source, and (ii) the alternator or the generator from which power is received during the engine mode, and wherein the third speed is greater than 0 and less than the first speed and the second speed;
   determining whether a system is operating in the shore power mode, the engine mode, or the battery mode;
   based on which one of the shore power mode, the engine mode, or the battery mode the system is operating in, performing at least one operation to determine whether to permit passage of a refrigerant through an evaporator and to determine whether to permit passage of the refrigerant through eutectic plates; and
   based on a result of the at least one operation, controlling passage of the refrigerant through at least one of the evaporator or the eutectic plates.

20. The method of claim 19, wherein the plurality of parameters comprise (i) a first parameter indicating whether shore power is connected, (ii) a second parameter indicating whether the alternator or the generator is ON and charging the first battery, and (iii) a suction pressure of the compressor.

21. The method of claim 19, wherein:
   the plurality of parameters comprise a state of charge of one or more batteries; and
   the one or more batteries include the first battery.

22. The method of claim 19, wherein while operating in the shore power mode:
   based on the temperature being less than a set point temperature, preventing the refrigerant from passing through eutectic plates and the evaporator; and
   based on the temperature being greater than the set point temperature, permitting the refrigerant to pass through the eutectic plates or the evaporator.

23. The method of claim 22, wherein while operating in the shore power mode:
   based on the temperature being greater than the set point temperature for more than a predetermined period, permitting passage of the refrigerant through the eutectic plates and the evaporator; and
   based on the temperature being greater than the set point temperature for less than the predetermined period, (i) permitting passage of the refrigerant through the eutectic plates, and (ii) preventing passage of the refrigerant through the evaporator.

24. The method of claim 19, further comprising, while operating in the shore power mode, (i) based on the plurality of parameters satisfying a plurality of conditions, setting the speed of the compressor to 0 for a first predetermined period, and (ii) subsequent to the first predetermined period, setting the speed of the compressor to a speed greater than 0 for a second predetermined period.

25. The method of claim 24, further comprising, while operating in the shore power mode, (i) based on an ambient temperature being greater than a predetermined temperature, setting the speed of the compressor to a speed less than or equal to the first speed, and (ii) based on the ambient temperature being less than the predetermined temperature, setting the speed of the compressor to the third speed or a speed less than the first speed.

26. The method of claim 25, further comprising, while operating in the shore power mode, (i) based on the ambient temperature being less than the predetermined temperature, setting the speed of the compressor to a speed less than or equal to the third speed for a third predetermined period, and (ii) subsequent to the third predetermined period, setting the speed of the compressor to a speed less than or equal to the first speed, wherein the third predetermined period is less than the second predetermined period.

27. The method of claim 19, further comprising, based on a suction pressure of the compressor, operating in a pulldown maintenance mode, wherein the pulldown maintenance mode comprises, based on the temperature, switching between (i) preventing passage of the refrigerant to eutectic plates and the evaporator, (ii) permitting passage of the refrigerant through the eutectic plates and preventing passage of the refrigerant through the evaporator, and (iii) permitting passage of the refrigerant through the eutectic plates and the evaporator.

28. The method of claim 27, further comprising:
adjusting the speed of the compressor while in each of the shore power mode, the engine mode and the battery mode; and
adjusting speeds of an evaporator fan and a condenser fan while in each of the shore power mode, the engine mode and the battery mode.

29. The method of claim 19, further comprising while operating in the engine mode:
based on the temperature being less than a set point temperature, preventing the refrigerant from passing through eutectic plates and the evaporator; and
based on the temperature being greater than the set point temperature, permitting the refrigerant to pass through the eutectic plates or the evaporator.

30. The method of claim 29, further comprising, while operating in the engine mode:
based on the temperature being greater than the set point temperature for more than a predetermined period, permitting passage of the refrigerant through the eutectic plates and the evaporator; and
based on the temperature being greater than the set point temperature for less than the predetermined period, (i) permitting passage of the refrigerant through the eutectic plates, and (ii) preventing passage of the refrigerant through the evaporator.

31. The method of claim 19, further comprising while operating in the battery mode:
based on the temperature being less than a set point temperature, preventing the refrigerant from passing through eutectic plates and the evaporator; and
based on the temperature being greater than the set point temperature, permitting the refrigerant to pass through the eutectic plates or the evaporator.

32. The method of claim 19, further comprising while in at least one of the shore power mode, the engine mode, or the battery mode:
shutting off an evaporator fan if a door of the temperature-controlled container is in an open state; and
running the evaporator fan based on the temperature when the door is in a closed state.

33. The system of claim 1, wherein the control module is configured to:
based on which one of the shore power mode, the engine mode, or the battery mode the system is operating, (a) perform a first operation to determine whether to permit passage of the refrigerant through the evaporator, and (b) perform a second operation to determine whether to permit passage of the refrigerant through eutectic plates, wherein the at least one operation includes the first operation and the second operation;
based on a result of the first operation, permit passage of the refrigerant through the evaporator; and
based on a result of the second operation, permit passage of the refrigerant through the eutectic plates.

34. The system of claim 1, wherein the control module is configured to:
while in the shore power mode, determine an ambient temperature, and based on the ambient temperature, control the speed of the compressor; and
while in the engine mode and the battery mode, control the speed of the compressor independent of the ambient temperature.

35. The system of claim 1, wherein the control module is configured to:
while in the engine mode and when the temperature is less than or within a predetermined range of a set temperature, run a condenser fan and permit passage of the refrigerant to the eutectic plates and an expansion valve; and
while in the battery mode and when the temperature is less than or within the predetermined range of the set temperature, shut off the condenser fan and prevent passage of the refrigerant to the eutectic plates and the expansion valve.

36. The system of claim 35, wherein the control module is configured to while in the engine mode and the battery mode and when the temperature is less than or within the predetermined range of the set temperature, shut off an evaporator fan and prevent passage of the refrigerant to the evaporator.

37. The system of claim 10, further comprising a control module, wherein:
the shore power module determines whether the suction pressure is less than or equal to a predetermined suction pressure; and
the control module is configured to, based on the temperature and a compressor ON time, control the compressor, an evaporator fan, a condenser fan, passage of the refrigerant through eutectic plates, and passage of the refrigerant through an expansion valve.

38. The system of claim 15, wherein the control module is configured to:
if the door is in the open state and the compressor has been running for a predetermined period, maintain the compressor and a condenser fan in an ON state and prevent passage of the refrigerant to the evaporator; and if the door is in the open state and the compressor has not been running for the predetermined period, shut off the compressor and the condenser fan and prevent passage of the refrigerant to the evaporator.

39. The method of claim 19, further comprising:

based on the operating mode, (a) performing a first operation to determine whether to permit passage of the refrigerant through the evaporator, and (b) performing a second operation to determine whether to permit passage of the refrigerant through eutectic plates;

based on a result of the first operation, permitting passage of the refrigerant through the evaporator; and based on a result of the second operation, permitting passage of the refrigerant through the eutectic plates.

40. The system of claim 1, wherein the refrigerant is a fluid.

41. The method of claim 19, further comprising, based on the temperature, switching between (i) preventing passage of the refrigerant to eutectic plates and the evaporator, (ii) permitting passage of the refrigerant through the eutectic plates and preventing passage of the refrigerant through the evaporator, and (iii) permitting passage of the refrigerant through the eutectic plates and the evaporator.

* * * * *